US006681380B1

(12) United States Patent
Britton et al.

(10) Patent No.: US 6,681,380 B1
(45) Date of Patent: Jan. 20, 2004

(54) AGGREGATING CONSTRAINTS AND/OR PREFERENCES USING AN INFERENCE ENGINE AND ENHANCED SCRIPTING LANGUAGE

(75) Inventors: Kathryn H. Britton, Chapel Hill, NC (US); Christopher R. Seekamp, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/504,209

(22) Filed: Feb. 15, 2000

(51) Int. Cl.$^7$ ................................................. G06F 9/44
(52) U.S. Cl. ........................... 717/115; 706/8; 706/47; 706/50
(58) Field of Search ................. 717/115, 143, 717/168–178; 706/11, 47, 50, 8

(56) References Cited

U.S. PATENT DOCUMENTS

| | | | | |
|---|---|---|---|---|
| 5,159,687 A | * | 10/1992 | Richburg | 717/106 |
| 5,687,378 A | * | 11/1997 | Mulchandani et al. | 717/131 |
| 5,701,400 A | * | 12/1997 | Amado | 706/45 |
| 5,734,798 A | * | 3/1998 | Allred | 706/47 |
| 5,778,231 A | * | 7/1998 | van Hoff et al. | 717/143 |
| 5,966,540 A | * | 10/1999 | Lister et al. | 717/174 |
| 6,094,221 A | * | 7/2000 | Andersion | 348/231 |
| 6,237,144 B1 | * | 5/2001 | Delo | 717/174 |
| 6,256,635 B1 | * | 7/2001 | Arrouye et al. | 707/102 |
| 6,266,811 B1 | * | 7/2001 | Nabahi | 717/174 |
| 6,269,480 B1 | * | 7/2001 | Curtis | 717/106 |
| 6,311,320 B1 | * | 10/2001 | Jibbe | 717/111 |
| 6,314,416 B1 | * | 11/2001 | Schiefele | 717/175 |
| 6,330,711 B1 | * | 12/2001 | Knutson | 717/100 |
| 6,353,925 B1 | * | 3/2002 | Stata et al. | 717/143 |

OTHER PUBLICATIONS

Bowen, Barry D., "The elephant is dancing nicely with Java", Jul. 1997, retrieved from http://www.javaworld.com/jw–07–1997/jw–07–ibm_p.html, on Jun. 6, 2002.*
Cowlishaw, Mike, "NetRexx–an alternative for writing Java classes", IBM UK Laboratories, retrieved from IEEE database Jun. 6, 2002.*
Cowlishaw, Mike, "NetRexx language quick start", retrieved from http://www2.hursley.ibm.com/netrexx/netrexx0.html on Jun. 6, 2002.*
"NetRexx 2", retrieved from http://www2.hursley.ibm.com/netrexx/nrwhat.html on Jun. 6, 2002.*

* cited by examiner

*Primary Examiner*—Tuan Dam
*Assistant Examiner*—Mary J. Steelman
(74) *Attorney, Agent, or Firm*—Jerry W. Herndon; Marcia L. Douber

(57) ABSTRACT

A method, system, and computer program product for aggregating constraints and/or preferences using an inference engine and an enhanced scripting language. Values of multiple factors and the interrelationships between the factors and their values are aggregated, and the result is used to tailor or direct the processing of a software program. This approach enables representing complex decisions in a straightforward manner, and avoids the need to modify the software program to account for new factors and/or new values thereof.

24 Claims, 17 Drawing Sheets

FIG. 5

ParseRule(RuleString)

500: premiseList = new empty List; conclusionList= new empty List

505: aPremise = next Premise expression from RuleString

510: aPremise null ?
- NO → 515: premExpr= ParsePremise(aPremise) → 520: add premExpr to premiseList → (loop back to 505)
- YES → 525: aConclusion = next conclusion expression from Rule String

530: aConclusion null ?
- NO → 540: conclExpr= ParseConcl(aConclusion) → 545: add conclExpr to conclusionList → (loop back to 525)
- YES → 535: Return Rule object ParsePremise(ExprString)

Unify(v, factsChain)

TryProof(premise, copyP, factsChain)

FIG. 17

1740
imageSizeQualityTradeoff=favorHighQuality
disposeImages=false
textLinksPreferredToImages=false

1760
deviceType=WML Device
desiredContentTypes=[text/vnd.wap.wml]
supportedImages=[gif]
fixedImageScale=true
imageScaleFactor=0.5
colorSupported=false
screenCapability=low
imageSizeQualityTradeoff=favorSmallSize

1700
framesSupported=true
desiredContentTypes=[text/html]
supportedImages=[gif, jpg]
unsupportedExtensions=[ ]
javaScriptSupported=true
screenCapability=high
clientSideImageMapsSupported=true
javaAppletsSupported=true
disposeImages=false
ObjectsSupported=true
imageScaleFactor=0.8
convertTablesToUnorderedLists=false
textLinksPreferredToImages=false
deviceType=WindowsNT/Netscape45
colorSupported=true

1720
textLinksPreferredToImages=true
disposeImages=true
imageSizeQualityTradeoff=favorSmallSize

AGGREGATING CONSTRAINTS AND/OR PREFERENCES USING AN INFERENCE ENGINE AND ENHANCED SCRIPTING LANGUAGE

BACKGROUND OF THE INVENTION

1. Field of the Invention

The present invention relates to a computer system, and deals more particularly with a method, system, and computer program product for using an inference engine, along with an enhanced scripting language, to aggregate constraints and/or preferences that are to be applied to affect program execution.

2. Description of the Related Art

It is often useful or required to be able to tailor the execution of a software program based on dynamically determined constraints or limitations of some portion of a system, and/or based on preferences provided by users or system administrators. As one example of when this type of tailoring is advantageous, when a computer user requests delivery of document content over a network connection (such as requesting a Web page from the World Wide Web or Internet), it is often preferable to perform one or more transformations on the requested document before transmitting it to the requester. The particular transformations to be performed may be tailored to constraints such as the type of device the user is currently using, the user agent or browser executing on the device, the type of connection and network bandwidth to the user's device, and may also account for this user's preferences related to, inter alia, Web document content.

Often, Web content is created for a generic audience, without regard to the limitations that might be preferable for different target audiences. For example, a Web document may contain relatively large embedded objects such as sound files, images, video, etc., or may contain links that will automatically retrieve objects of this type. When the target device is a relatively powerful machine with a large storage capacity such as a desktop computer connected over a local area network (LAN), then downloading this type of document content is unlikely to create problems. However, it is becoming increasingly common for users to connect to the Internet with small, handheld devices that have limited memory and storage, as well as limited display space and display screens with low resolution. Such devices, referred to commonly as "constrained devices", also typically have low power CPUs and are capable of supporting only low bandwidth connections, therefore resulting in high network latency. When a document requester is using this type of constrained device, then there may not be sufficient space for receiving and storing large Web documents on the device. In addition, the processing capabilities of a constrained device may be insufficient for a document created without regard to the limitations of these devices. Furthermore, users of constrained devices typically connect to a network using relatively expensive wireless connections, and/or connections with limited bandwidth. In such cases, the cost of receiving data content can be prohibitive, and it becomes imperative that only content which is important and necessary be sent to the end user, and that this content be sent in a format appropriate for the user's device.

Constrained devices that are commonly used in Internet communication include cellular phones, screenphones, pagers, and laptop computers. An example of this type of device is the Nokia 7110, a cellular phone with a maximum display area of 6 lines of text. Another example device is the WorkPad available from the International Business Machines Corporation ("IBM"). This device is a handheld computer typically configured with several megabytes of storage, where that storage is provided as Random Access Memory ("RAM") to avoid the system overhead associated with other types of storage such as disk drives. ("WorkPad" is a registered trademark of IBM.)

Examples of the types of constraint-based tailoring that are desirable for a Web document include omitting images if the target device only supports a textual display or has very limited display space; converting text to speech if the target device is a wearable computing device with no display; transcoding full-color images to grayscale if the connection type is wireless, to reduce transmission time; omitting portions of the content that cannot be processed by the target user agent or browser; etc. Similar tailoring may be applied based on a user's preferences. For example, a user might specify that he or she wishes to receive images except when using his or her WorkPad device, in which case the images are to be omitted, or that only the first 100 characters of a text file are to be transmitted when he or she is using a cell phone. Furthermore, a systems administrator may specify preferences that are to be applied, such as omitting images for documents requested by all employees in a particular department or other classification.

Traditionally, conditional logic is used to tailor the execution of a software program based on factors that may vary in value (such as those which have been described above), where the conditional logic is coded as an integral part of the software and accounts for expected values of predetermined factors. However, this approach has a number of disadvantages.

First, programming skill is required to include the conditional logic within the program. The programmer must write code to handle every expected factor, and every expected value of those factors.

Second, this approach is relatively inflexible: it is not possible to account for new factors (or new values of existing factors where the new values should be separately addressed), for example, without modifying the software. As is well known, modification of software is a costly process, involving debugging, redistribution, reinstallation, etc. In the previously-discussed scenario where the tailoring process is directed toward transforming Web document content, the factors which were described included the device type, network connection type, bandwidth, user agent or browser type, and user or administrator preferences. Given the proliferation of new computing devices, it is easy to see that statically-written conditional logic code of the form "IF device-type=... THEN do ... " may need constant revision to properly account for the types of target devices which the program's users may be using, and is therefore an unsatisfactory approach. It would be preferable to enable system administrators and/or end users to determine how the conditional logic should be structured, and how it should be modified when necessary, as these are the people most directly involved with day-to-day operation of the resulting system. However, it is unlikely that the administrators and users will have the required skills or training that would be required to modify the software. In addition, modification of the software requires that the source code has been provided, which is often not the case.

Third, the values of the various factors may come from different sources. The user agent type, for example, is typically found in the header of the document request message. The identification of the user, used to locate user preferences, may come from this header or may be determined in another manner (such as by using information from the header to consult an index of users or employees). The program must contain code to locate the values of each factor for which conditional logic will be executed, and thus needs to be modified to account for any new sources that may become available.

Fourth, this conditional logic approach, which may have to account for many values of many factors as well as interrelationships between them, makes the resulting program much more complicated and thus harder to write, debug, and maintain. The program may also execute more slowly due to the complicated conditional logic.

Finally, including the conditional logic within the code which uses the result of the logic is not an optimal design strategy. The core function of the code, which merely needs to use the result of the conditional logic, may be obscured due to the added complexity introduced by the code which determines the conditional result.

Accounting for the values of multiple factors and the interrelationships between the factors and their values is referred to herein as "aggregation". As a simple example of what is required, suppose a constraint for the user's device indicates that images are to be transcoded from full color to 16 color; the connection type indicates that full color images are to be transcoded to grayscale; and the user's preference for this device type using this connection type is to completely omit images. Intuitively, it can be seen that in this example the omission of images is the most restrictive and therefore probably the preferred content tailoring process. It is likely that more factors beyond those which have been described may become pertinent to the tailoring process. For example, time of day and day of the week may influence the cost of data transmission, or a user's network subscription service may have graduated pricing based upon usage. As more factors and more values are added to the aggregation process, the complexity of determining the result increases substantially. For the reasons discussed above, using conditional logic coded directly into an application program is an unsatisfactory technique for performing the aggregation.

Accordingly, what is needed is an improved technique for tailoring software execution based upon an aggregation of information, where this technique does not suffer from the disadvantages that result from statically coding aggregation logic into the software that is to use the aggregation result.

SUMMARY OF THE INVENTION

An object of the present invention is to provide an improved technique for tailoring the execution of a software program based upon an aggregation of information.

It is another object of the present invention to provide this technique by aggregating constraints and/or preferences that influence the tailoring process.

Another object of the present invention is to provide this technique using an inference engine and an enhanced scripting language.

It is another object of the present invention to provide this technique whereby the aggregated constraints and/or preferences are used to tailor document content for delivery to a requester in a networking environment.

Still another object of the present invention is to provide this technique where the inference engine uses backward chaining.

Yet another object of the present invention is to provide an alternative where the inference engine uses forward chaining.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, a system, and a method for tailoring execution of a software program based on aggregated information. This technique comprises: transforming one or more rules expressed in an enhanced scripting language into rules expressed in an existing scripting language; executing an inference engine; and using the aggregated result in the software program. Executing the inference engine further comprises: processing the one or more rules expressed in the existing scripting language;

evaluating a plurality of values, wherein each of the values may express a constraint value or a preference value; and determining an aggregated result using the processed rules and the evaluated values.

The enhanced scripting language preferably comprises the existing scripting language with an additional notational element added, and the transformation further preferably comprises: locating each of the notational elements in each of the rules being transformed; replacing the located notational elements with a value-searching syntax when the located notation element was in a premise of the rule being transformed; and replacing the located notational elements with a value-setting syntax when the located notation element was in a conclusion of the rule being transformed. The notational element is preferably a character not normally used in the scripting language as an operator or to begin an identifier, such as the "@" character.

The technique may further comprise compiling the transformed rules prior to execution of the inference engine. The existing scripting language may be NetRexx.

The inference engine may be a backward chaining inference engine, or a forward chaining inference engine.

The present invention will now be described with reference to the following drawings, in which like reference numbers denote the same element throughout.

BRIEF DESCRIPTION OF THE DRAWINGS

FIGS. 4 through 16 illustrate flow charts which set forth the logic which may be used to implement a preferred embodiment of the present invention; and FIG. 17 illustrates an example of factors and values which is used in describing the preferred embodiment.

DESCRIPTION OF THE PREFERRED EMBODIMENT

Figure 1:
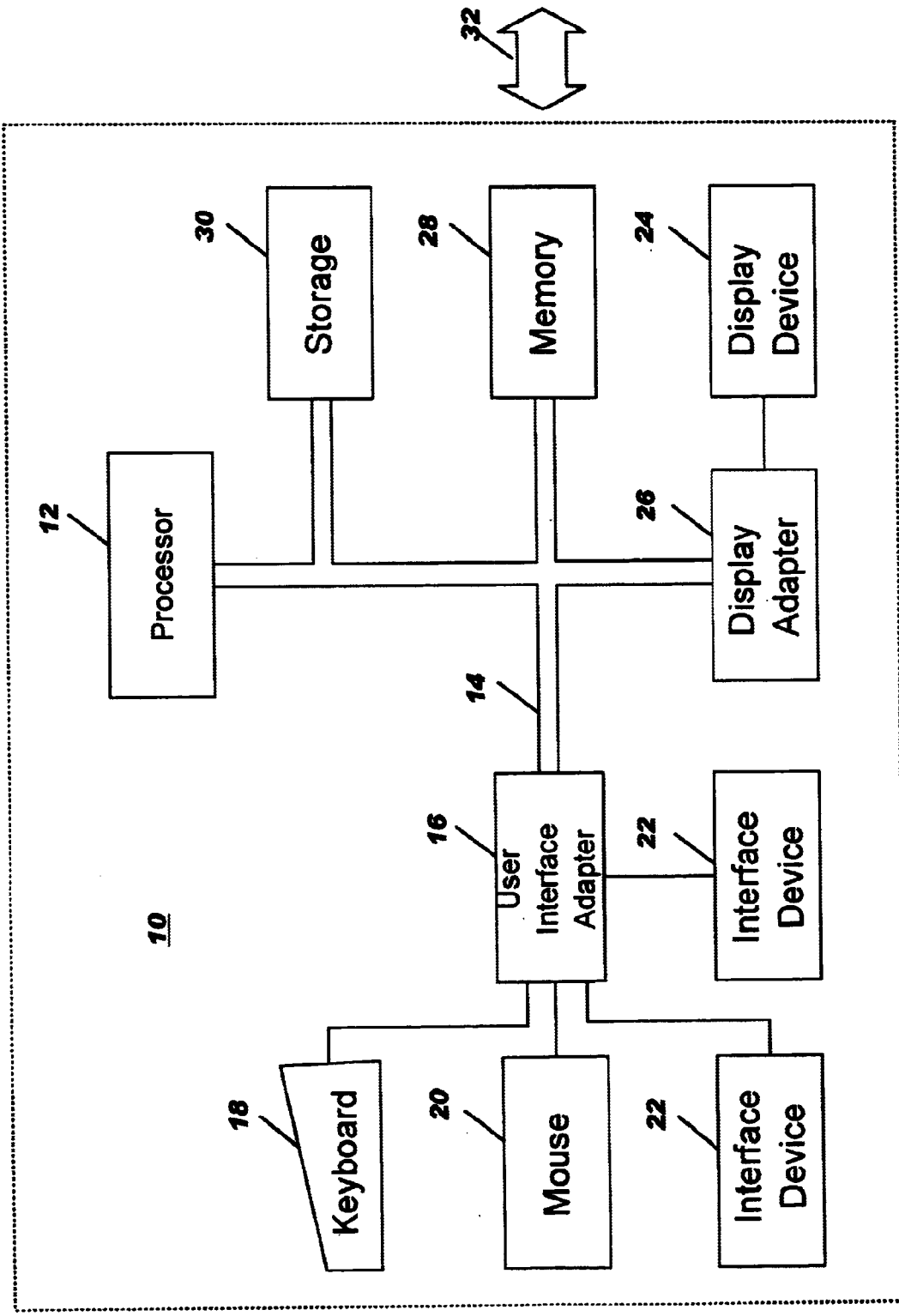
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
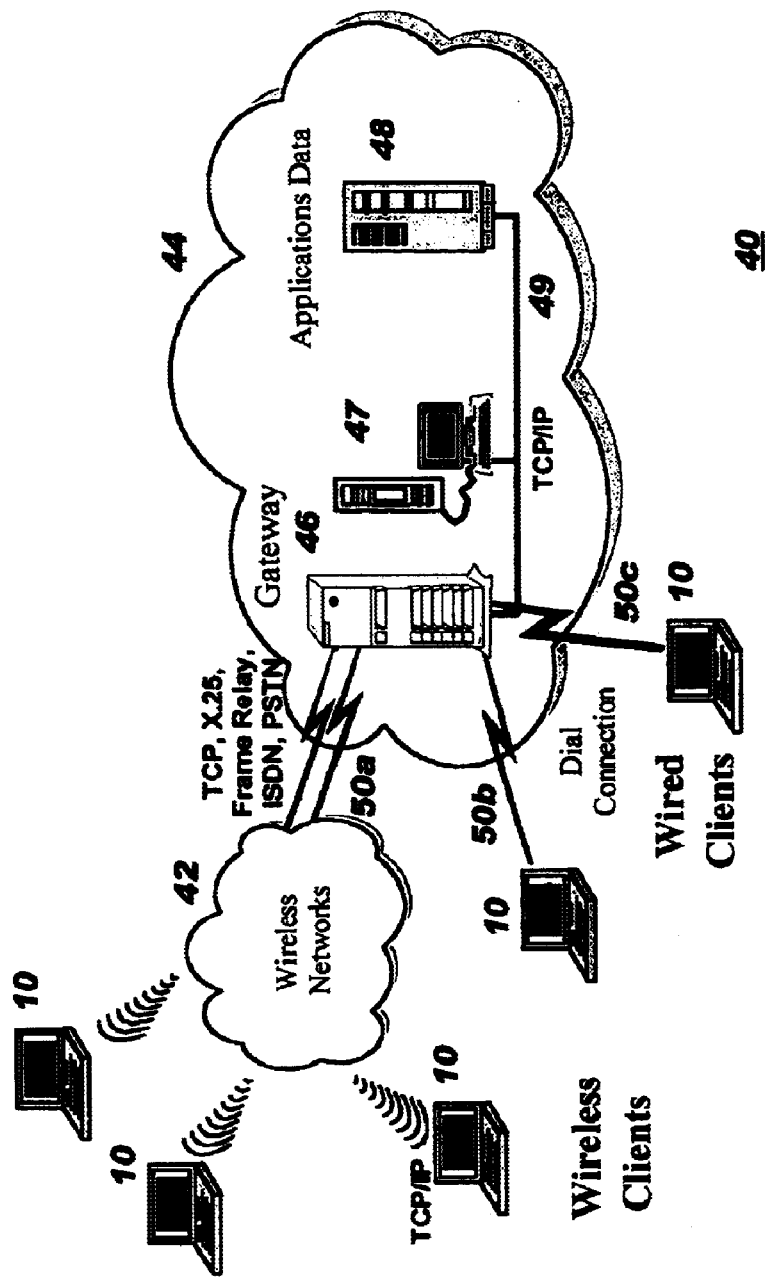
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the server 47 or gateway 46 (or of the workstation 10, when the workstation is capable of executing the present invention) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Or, the present invention may be used in a stand-alone mode without having a network connection, whereby operation in this stand-alone mode prepares one or more documents for subsequent transmission. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The present invention provides an advantageous technique for aggregating information (such as constraints and/or preferences) to dynamically affect program execution, while avoiding the previously discussed problems that may be encountered when attempting to use traditional statically coded conditional logic for this purpose. In the preferred embodiment, the present invention is implemented as one or more computer software programs. The implementation of the software of the present invention may operate on a server or intermediary device in a network, as one or more modules (also referred to as code subroutines, or "objects" in object-oriented programming). Alternatively, the software may operate on a user's workstation. Or, the software may execute on multiple devices in a distributed manner, without deviating from the inventive concepts disclosed herein. An implementation of the present invention may be executing in a Web environment, for example for dynamically aggregating information to transform Web pages for delivery through the Internet. Alternatively, an implementation of the present invention may be executing in a corporate intranet or extranet, or in any other network environment. In addition, the present invention may be used in a disconnected (stand-alone) mode. Configurations for the environment include a client/server network, as well as a multi-tier environment. These environments and configurations are well known in the art.

While the preferred embodiment is described herein with reference to dynamically tailoring program execution where the resulting tailored programs are used for transforming Web content, this is by way of illustration and not of limitation. The present invention may also be used advantageously for dynamically tailoring program execution for other environments and other purposes.

The present invention uses a rule-based system for aggregating information, and uses that aggregated information to tailor program execution. Rule-based systems are well suited to the type of complex problem solving which has been discussed, wherein factors having a number of potential values must be aggregated, and where the factors and values thereof are subject to ongoing revision and expansion. Rule-based systems employ an inference engine that operates upon a set of facts and a set of rules. The sets of facts and rules may vary from having a few entries to having hundreds or thousands of entries. Such systems are able to perform efficiently because they are designed specifically for applying rules to facts and are therefore optimized for this task.

Furthermore, an enhanced scripting language is used, according to the present invention, for specifying the rules to be used in the aggregation process. This combination of a rule-based system and an enhanced scripting language offers a number of advantages over a traditional statically coded logic approach to aggregation. First, the logic is easy to modify and to extend by system users in the approach adopted by the present invention. Because the rules are separated from the program itself, the decisions embodied in the rules may be altered simply by changing the affected rules or by adding new rules, without changing the program that will use the result of the decision. For example, if a new device type becomes available, device-specific rules can be added to the rules base using simply a text editor (or perhaps a tool adapted to rule-creation). Scripting languages are typically less complex and therefore simpler to understand than programming languages, yet they typically provide very powerful constructs. By choosing an enhanced scripting language over a programming language, the preferred embodiment enables system users to construct their own rules to embody complicated decision-making without requiring those users to have sophisticated programming skills. Many system users will already be familiar with one or more scripting languages, and thus will only be required to learn the simple syntax extension (described in detail below) which is defined for the preferred embodiment. Another advantage of the present invention is that, because of the manner in which a rule-based system (including the system defined herein) automatically accounts for interrelationships among the conditions and values that go into the aggregation process, the complex conditional logic that arises when using conventional programming languages for this purpose is avoided. By omitting this complex logic from the software which will use the aggregation result, the software is much easier to debug and maintain. Yet another advantage of the present invention is that additional sources for the values to be aggregated may be easily accommodated in the rule-based system. Suppose, for example, that an existing rule aggregates values using input from two sources to determine a transcoding process to apply to images to be transmitted over a network, where the two sources may be the type of network connection to the requester and the type of device which will receive the transmission. An additional factor such as the image-receiving preferences of a particular user can easily be factored into the aggregation process using the present invention. Rather than altering statically coded logic and then recompiling and retesting the modified software as would be required in the prior art, the present invention enables accounting for the additional information in the aggregation result by modifying one or more existing rules (or perhaps by adding new rules).

Several techniques are known in the art for using dynamically determined values to transform Web content. Style sheets are one such technique. However, this approach requires a user to understand the complex style sheet notation in order to extend the aggregation process to account for new information sources and values. In addition, style sheets suffer from the same disadvantage as conventional programming languages when complex interrelationships among information sources and values must be represented: that is, the expression of the interrelationships becomes very complicated and is therefore more error-prone and more difficult to create, debug, and maintain.

The preferred embodiment of the present invention will now be discussed in more detail with reference to FIGS. 3 through 17.

Figure 3:
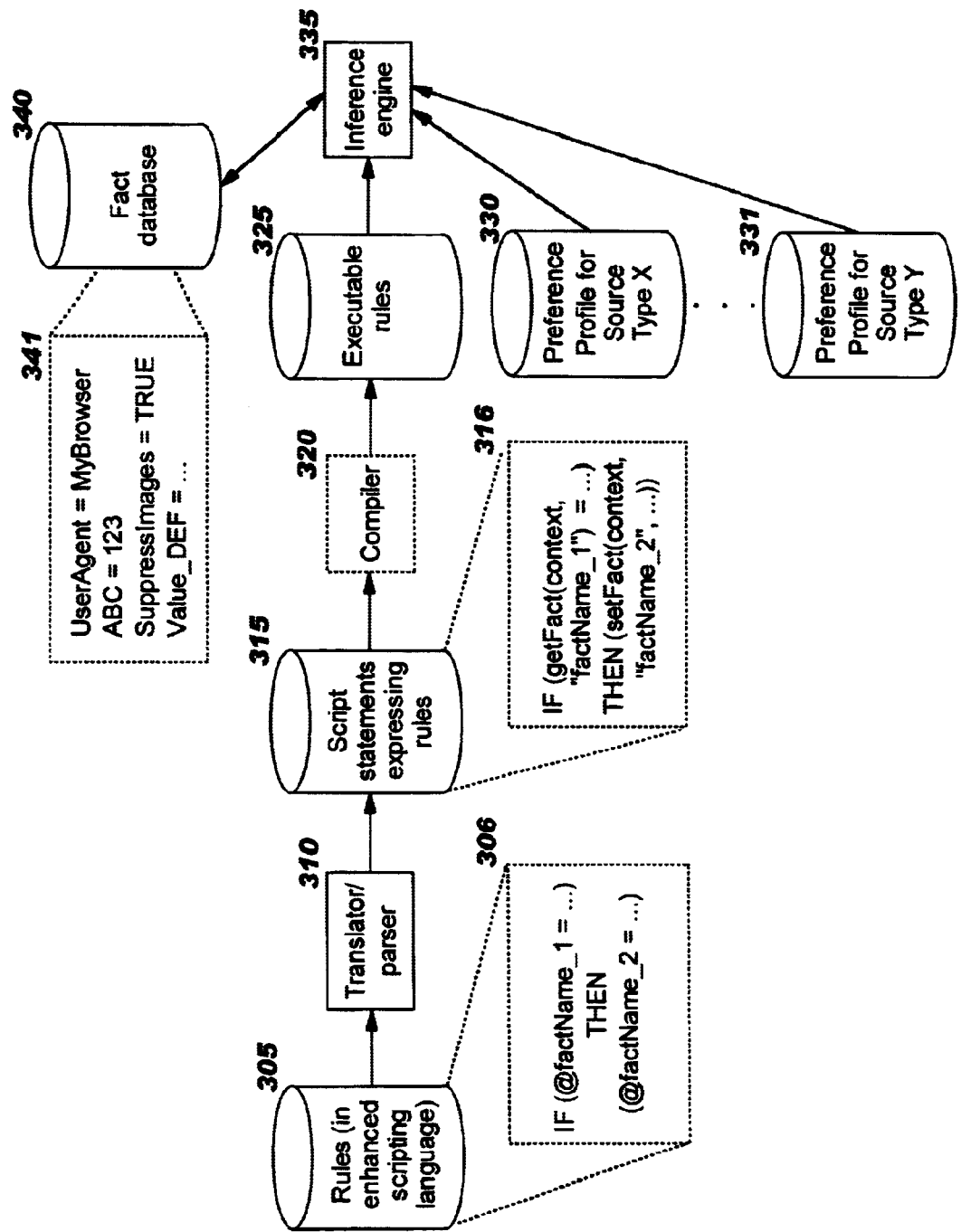
FIG. 3 illustrates the components involved in operating a preferred embodiment of the present invention.

FIG. 3 illustrates, at a high level, the components involved in operating a preferred embodiment of the present invention. Rules 305 expressed in an enhanced scripting language are processed by a translation or parsing process 310, creating script statements 315 which express rules using an existing scripting language syntax. A preferred embodiment of this translation is described in detail below, with reference to FIGS. 4–7. If a compiled scripting language is used, the script statements 315 are then compiled as shown at 320, creating executable rules 325. An interpreted scripting language may be used alternatively, in which case script statements 315 are the executable rules 325 without requiring a compilation step. Preferences or profiles for one or more different source types 330, 331 are used as input to an inference engine 335, along with the executable rules 325 and facts 341 from a fact database 340. These components will now be described in more detail.

As with typical rule-based systems, the inference engine 335 of the present invention enables making queries which causes the rules 325 to be evaluated against the facts 341 in the fact database 340 to attempt to provide answers to the queries. The inference engine 335 contains logic to continually evaluate the rules (because evaluation of rules may generate more facts) until the query is solved, or until it can be determined that the query cannot be solved with the given set of rules and facts. A simple rule-based language syntax consists of statements of the form:

IF (predicate_1) (predicate_2) . . . (predicate_N)
   THEN (conclusion_1) (conclusion_2) . . .
     (conclusion_Y)

This type of predicate-conclusion syntax may be used for setting variables or properties to particular values. In the scenario of transforming Web pages to be transmitted over a network, an example predicate may be "(networkSpeed<14400)" and a conclusion using this predicate might be "(criticalInformationOnly=TRUE)", to indicate that only critical information is to be transmitted when the network speed is very slow.

Combining rules with a scripting language for aggregation, according to the present invention, enables creating a powerful and expressive rules language which takes advantage of the power and complexity of the underlying scripting language. One of the benefits of a scripting language such as NetRexx, which is used as the scripting language of the preferred embodiment, is that it allows use of typeless variables to form expressions. That is, values are normally treated as strings, but if a variable is used in an arithmetic expression then it is automatically converted from string form to numeric form. For example, if the variable A has the value 2, then the expression "A+1" is evaluated by converting the string "1" to the number 1, adding this to the number 2, and then converting the resulting value "3" back to a string. Additionally, scripting languages such as NetRexx have many useful built-in functions. For example, the "POS" (which is an abbreviation for "position") function takes as input a target string and a source string in which to search for the target string. The function returns either (1) a the position within the source string where the target string was located, or (2) a zero otherwise. (For more information on the NetRexx language, refer to location http://www.ibm.com/technology/NetRexx on the Web, or contact your local IBM branch office.)

In order to use the full power of the scripting language, including its variables and type conversion features, while still allowing access to facts in the fact database, the present invention defines a notational key to denote reference to a fact within a script language statement. According to the preferred embodiment, the character "@" is used as the notational key, and is prepended to the name of facts within rules. This "@" character is a scripting language enhancement defined by the present invention, and thus it can be seen that a user who is already familiar with the syntax of the scripting language can easily learn to create rules using this syntax enhancement. Using this syntax extension to express rules to be processed by the present invention yields rules 305, 306 of the form:

IF (premise_1) (premise_2) ... (premise_N)
    THEN (conclusion_1) (conclusion_2) ...
      (conclusion_M)

where each premise may specify a Boolean expression using a variable name and each conclusion may assign a value to a variable name. (Each premise and conclusion may also specify one or more built-in functions of the underlying scripting language, as discussed above.) Each variable name which is to use a matching fact in the facts database as the input value for the variable (in the case of premises) or which is to set a value of a fact in the facts database (in the case of conclusions) is of the form "@factName", as illustrated at element 306 of FIG. 3.

Using the previous example of transforming Web pages to be transmitted over a network, an input rule may be written as:

IF (@networkSpeed<14400)
    THEN (@criticalInformationOnly=TRUE)

As another example, suppose it is necessary to determine whether or not the user's browser supports powerful features. Clues may be used in making this determination, such as whether the user agent is a Mozilla agent. A rule to express this may be represented as:

IF (pos(@User_Agent), "Mozilla")>0)
    THEN (@browserType="powerful")

In other words, if the string "Mozilla" is found anywhere in the string stored as the variable User_Agent, then the variable browserType is to be set to the string "powerful". The application using this decision then presumably operates, differently based upon whether the browserType is set to "powerful" or to some other value.

Since the existing scripting language does not understand this "@" syntax or its semantics, the input rules 305 are first parsed 310 into script statements 315, 316 in a syntax which is supported directly by the scripting language. According to the preferred embodiment, functions having names such as "getFact" and "setFact" are defined, where the getFact function has the signature "getFact (ExpressionContext context, String name)" and the setFact function has the signature "setFact (ExpressionContext context, String name, Object value)". Accordingly, the rules described above are then translated to the syntax:

IF (getFact (context, "networkSpeed")<14400)
    THEN (setFact (context, "criticalInformationOnly", 1))
  IF (pos (getFact (context, "User_Agent"), "Mozilla")>0)
    THEN (setFact (context, "browserType", "powerful"))

(Note that, according to the preferred embodiment, if TRUE or FALSE appears in an input rule, the values 1 and 0 are substituted during the parsing process, respectively.)

The getFact and setFact functions (or methods, equivalently) are implemented as preference value lookup code and preference value setting code, respectively. The getFact function uses the input parameters to determine which preference value to retrieve from the fact database, and the setFact function uses its additional third parameter to set the specified preference value in the fact database.

The enhancements defined herein for a scripting language may be used as enhancements to either an interpreted script language or a compiled script language. In the preferred embodiment, the NetRexx language is used, which compiles a form of the REXX scripting language directly into Java™ bytecodes. Rules languages are known which are built upon interpreted languages such as Prolog, LISP, or Scheme. However, these interpreted languages are not available on all platforms, or when available, may have performance issues. The NetRexx language avoids these problems and also provides the advantageous type-independent features described above. ("Java" is a trademark of Sun Microsystems, Inc.)

Values of many factors may be used in the aggregation process described herein. When used for tailoring document delivery in a network environment, these factors include, but are not limited to, one or more of: the capabilities of the client device; the connection type over which the content will be delivered; the network bandwidth of the connection; the type of user agent operating on the client device; preferences of a particular user; preferences set by a systems administrator or other such person (or preferences generated in an automated manner); preferences for a particular application executing in a particular domain; etc. Preferably, these values are represented as name/value pairs which are stored as preference sets or profiles (such as elements 330, 331 of FIG. 3 and the examples depicted in FIG. 17). The key in each pair is the name of a preference, and the value is then the value for that preference. These profiles may be stored in many different forms without deviating from the scope of the present invention, such as: properties of an object; attributes in a database; attributes of a structured document such as an Extensible Markup Language (XML) document; etc.

Examples of several preference profiles that may be used as elements 330, 331, etc. are depicted in FIG. 17. Profile 1700 contains fifteen different key/value pairs, profile 1760 contains eight key/value pairs, and profiles 1720 and 1740 each contain three key/value pairs. Profile 1700 represents typical preferences and values that may be applicable for transforming Web document content for delivery to a device using a Netscape browser. Profiles 1720 and 1740 represent preference information that may be applicable for transforming content to be transmitted across a wireless link or a LAN connection, respectively. (Note that the three preference names in these profiles 1720, 1740 are identical, yet are not required to appear in the same order in each profile. This illustrates the fact that new preference key/value pairs may be added to profiles in an easily-extendable manner, without requiring users to adhere to a strict proforma.) Finally, profile 1760 represents preference information that may be applicable for transforming content destined for a constrained device such as a WAP (Wireless Application Protocol) client which uses the Wireless Markup Language ("WML"). Profiles for use with the present invention may be created using, for example, a simple text editor. ("Netscape" is a registered trademark of Netscape Communications Corporation.)

Given that fact values have been placed in various source files of this type (e.g. a device profile 1700 describing properties of a Netscape browser), there are at least two techniques with which the rule based system of the present invention may access these values. First, an obvious approach is to define a function that allows getting a property from a particular source. For instance, assume a function called "getProperty" is defined, where this function takes the source file name and the name of the property as the values. The function call getProperty ("Netscape.profile", "criticalInformation") would then return the value of the criticalInformation value in the Netscape.profile source file. In order to know that a value would be successfully obtained from a particular source file in the conclusion, an additional premise would be added to the rule verifying that the value existed. Thus in this approach a rule such as the following might be defined:

IF ((@device_source=="Netscape.profile")
 (getProperty("Netscape.profile", "criticalInformation")
 \==null)
  THEN (@criticalInformation=getProperty
   ("Netscape.profile",
    "criticalInformation"))

Another obvious way to access the values in the source files is an optimization of the first. That is, assuming the source files are somewhat static (i.e. are not continuously changing), the source files can be read at initialization time of the rules system (and when notified of updates), and rules can then be generated based on the values read. (It will be obvious to one of ordinary skill in the art how this generation process may be implemented.) That is, given that the Netscape.profile has been read and the value of criticalInformation is found to be 1 (for example), it is known that this source file contains a value for criticalInformation and the value is also known. Thus, the aforementioned rule can be optimized to the following:

IF (@device_source=="Netscape.profile")
 THEN (@criticalInformation=1)

Building on the previous discussion of determining device source based on the User Agent, the following static rule would then be generated:

IF(pos(@User_Agent, "Mozilla")>0)
 THEN(@device_source="Netscape.profile")

(In other words, if the User Agent is Mozilla, then use the Netscape profile such as example profile 1700.) With the dynamically generated rule:

IF (@device_source=="Netscape.profile")
 THEN (@criticalInformation=1)

it can be seen how, based on a User Agent value containing the string "Mozilla", the value of criticalInformation can determined when asked for. Because this second approach results in fewer premises within the rules, as well as fewer rule failures at execution time, it is used with the preferred embodiment of the present invention.

As previously stated, an inference engine such as engine 335 operates on facts 340 and rules 325, and attempts to solve rules by issuing queries against the set of available facts. Rules have conclusions which may set more facts. These new facts can then be used to solve more rules, in an iterative manner. According to the present invention, the facts 341 in the fact database 340 are simply preference names and their associated values. The particular facts 341 included in the fact database 340 during an invocation of the present invention are created by selecting particular preferences and values from the preference profiles 330, 331 according to execution of the rules 325. As shown at 341 of FIG. 3, the facts may be represented with a "preference_name=preference_value" syntax. Alternatively, the facts may be represented as name/value pairs which delimit the name from the value using an alternative syntax such as a comma. Or, the facts may be stored using other equivalent representations such as tables, tuples in a database, etc.

Note that an implementation of inference engine 335 is defined herein for use with the preferred embodiment; however, an appropriate commercially available inference engine may be substituted without deviating from the scope of the present invention.

The flowcharts in FIGS. 4 through 16 illustrate logic that may be used to implement a preferred embodiment of the present invention. FIGS. 4 through 7 represent the processing of component 310 of FIG. 3, and FIG. 8 represents an optional additional process that may be used at this point (as will be described below). FIGS. 9 through 16 illustrate the processing used by the inference engine 335.

Figure 4:
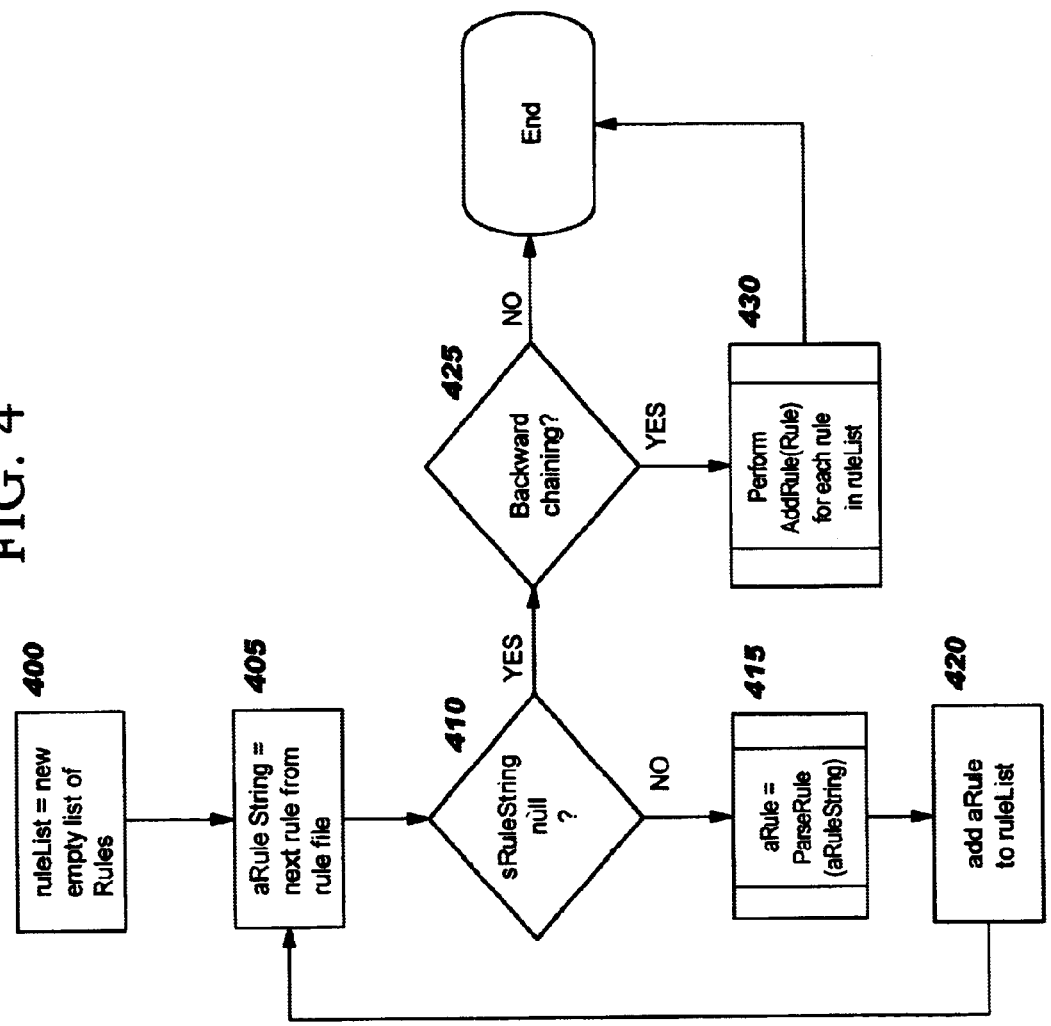

FIG. 4 illustrates the top-level processing logic with which the preferred embodiment of the present invention may be implemented, and begins the parsing or translation process whereby the rules written by a system user are transformed into rules in a conventional scripting language. Depending on how often new rules are created, this parsing process may be invoked each time the present invention operates to perform an aggregation of information, or it may be invoked less often (for example, only when new rules have been created, or at predetermined periodic intervals, etc.). At Block 400, the rules available to the system are initialized to an empty list of rules. According to the preferred embodiment, the list of rules is represented as rule objects, where each rule object comprises a premise list and a conclusions list. Block 405 reads the next input rule from a storage repository such as file 305 into which rules have been entered. (As previously stated, the input rules are of the form "IF (premise_1) . . . THEN (conclusion_1) . . . ", where the fact names within the premises and conclusions have a prepended "@" character.) Block 410 checks to see if this rule is null. If so, this indicates that all the rules in the input have been processed, and control transfers to Block 425. If Block 410 has a negative result, however, there are still more input rules, and processing continues at Block 415.

Block 415 passes the input rule as a parameter to the ParseRule function depicted in FIG. 5, which parses the rule and returns it as a rule comprised of a premise list and a conclusion list. This returned rule is added to the list of available rules by Block 420, after which control returns to Block 405 to process the next input rule.

Figure 8:
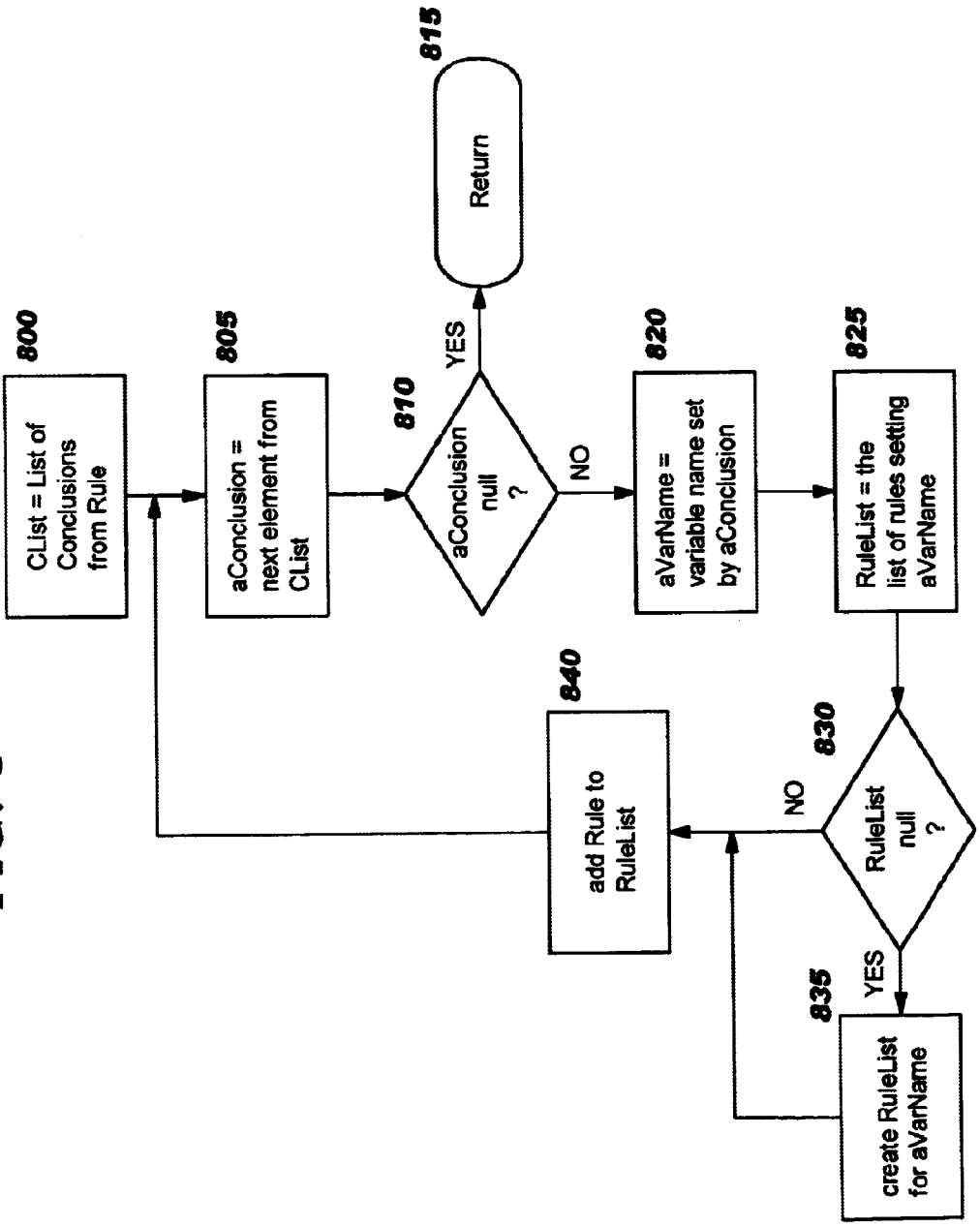
Figure 9:
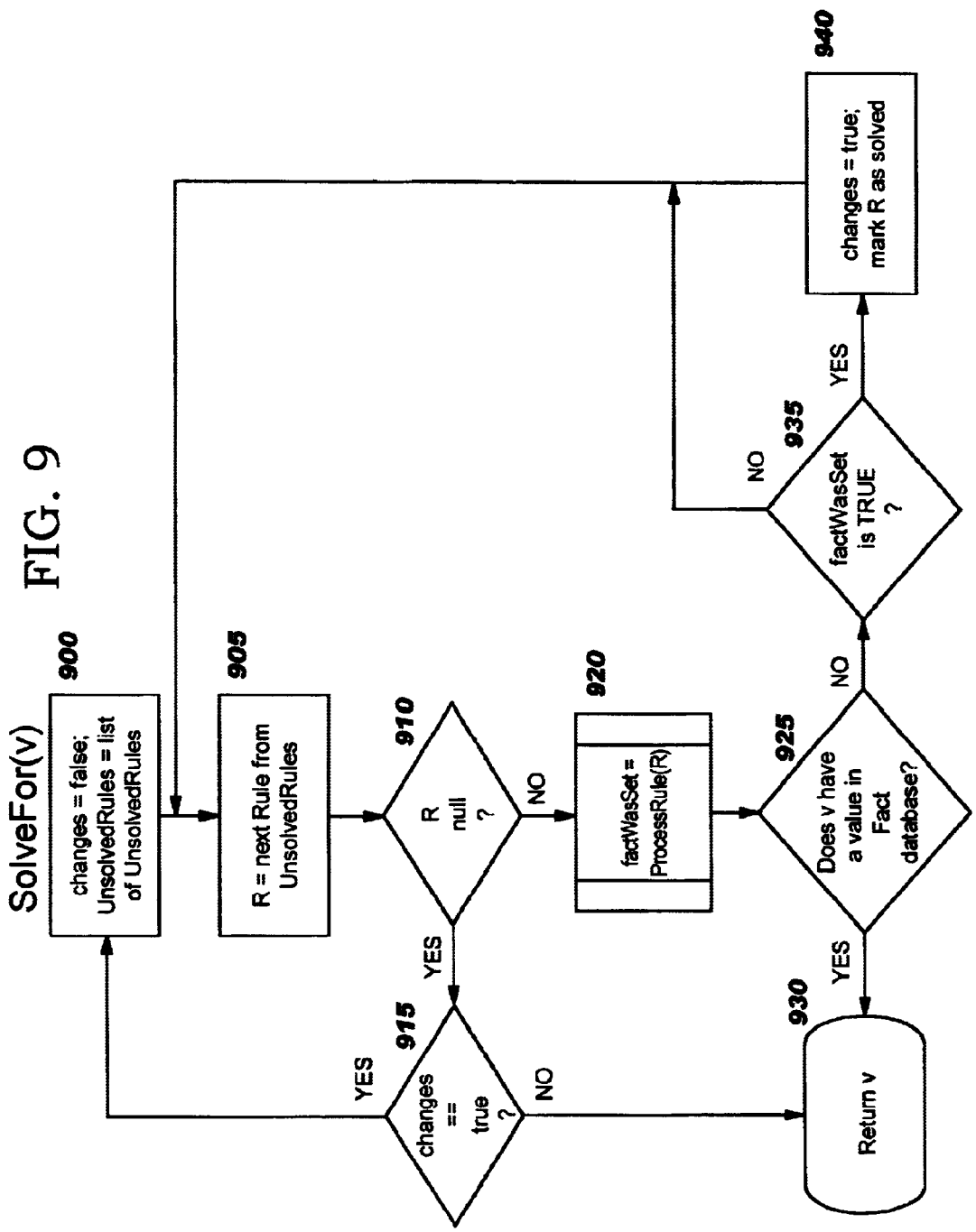
Figure 10:
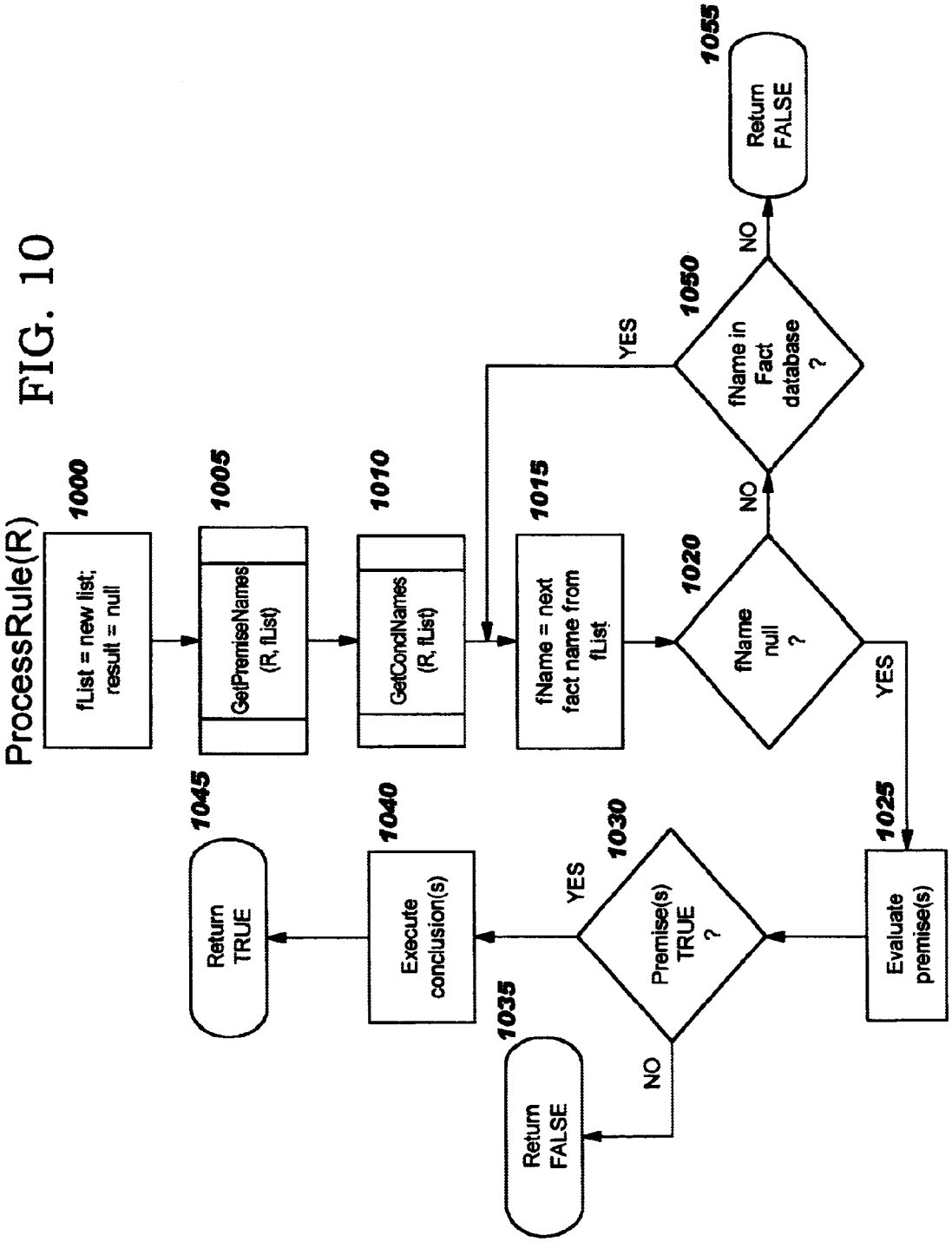

Control reaches Block 425, when Block 410 has a positive result. Block 425 asks whether a backward chaining approach is being used. If so, then the AddRule function depicted in FIG. 8 is invoked at Block 430 to further process each rule which has been added to the rule base by the processing of FIG. 4. Rule based systems are categorized as either forward chaining or backward chaining. Either type may, be used with the present invention, although backward chaining is preferred in environments where many rules are needed. Both solutions are described herein, as each may be used advantageously in appropriate environments. (As will be obvious to one of skill in the art, an implementation of the present invention will typically support only one approach, and the test in Block 425 has been shown in FIG. 4 to emphasize the choices available. In an actual implementation, this test is preferably omitted. If the implementation uses forward chaining, then the logic of FIGS. 8 and 11–16 is preferably omitted as well. If the implementation uses backward chaining, then the logic of FIG. 8 may be invoked immediately following the positive result at Block 410, and the logic of FIGS. 9 and 10 is preferably omitted.)

The concepts of forward and backward chaining are well known in the industry, and will not be described in detail herein. Forward chaining attempts to apply all available rules until either (1) the desired conclusion is reached or (2) an iteration is made through the entire set of rules without reaching the desired conclusion and without triggering or firing any conclusions which set new facts. For example, suppose a rule of the form "IF x>1 THEN y=2" exists but x has no value. Further suppose that the rule base contains another rule which states "IF true THEN x=5". In this case, once the second rule has been evaluated and has set the value of x, the first rule will be solved by a subsequent iteration (thereby setting a value for y). Backward chaining, on the other hand, begins with a hypothesis for reaching a conclusion, and works backward to attempt to find rules to support that conclusion. Using the same two example rules in the scenario just discussed, assume the conclusion to be reached is a value for y. The backward chaining system, upon finding that y has no value, detects that the rule "IF x>1 THEN y=2" will set a value for y. However, this rule cannot be fired immediately because the premise is not true (that is, x has no value). The system therefore attempts to find a rule that will set a value for x, and finds the rule "IF true THEN x=5". This rule can be immediately fired, resulting in setting a value for x. Thus, the other rule can be evaluated, and will set a value for y. As can be seen by this simple example, a backward chaining system applies only those rules that may possibly lead to the desired conclusion, whereas a forward chaining system may apply every rule in the rule base. Thus, assuming that an invocation of the present invention is interested in finding values for only a (perhaps small) subset of the preferences for which rules are represented in the rule base, a backward chaining implementation offers a distinct performance advantage in attempting only those rules which may lead to the desired conclusion.

FIG. 5 illustrates a preferred embodiment of the ParseRule function which was invoked from Block 415 of FIG. 4. Block 500 begins by initializing a premise list and a conclusion list to empty lists. Block 505 then locates the next premise in the IF part of the rule which was passed as the input parameter. Each rule contains at least one premise. According to the preferred it embodiment, when more than one premise appears, each is preferably evaluated as having an implied AND relationship to the others. (Alternatively, a notation may be used which supports explicit Boolean operators, provided that appropriate modifications are made to the logic depicted for the preferred embodiment. However, because a rule based system provides support for OR conditions in premises by simply writing additional rules for each such premise, where each additional rule has a duplicate conclusion, it is not anticipated that such alternative notations are necessary.)

Block 510 checks to see if the premise is null, indicating that the last premise for this rule has already been processed. If so, control transfers to Block 525; otherwise, Blocks 515 and 520 are invoked to process the premise and add it to the premise list for this rule, respectively. The premise is processed (Block 515) by invoking the ParsePremise function depicted in FIG. 6. After adding this parsed premise to the premise list (Block 520), control returns to Block 505 to begin processing the next (if any) premise for this rule.

Upon reaching Block 525, all the premises for this rule have been processed. Block 525 then finds the next conclusion in the THEN part of the input rule. Multiple conclusions may be present in each rule. In this situation, when the premise of the rule is satisfied during execution, each conclusion in the rule will be executed (fired) in turn. Block 530 tests to see if the conclusion is null, indicating that the end of the conclusion list for this input rule has been reached. If Block 530 has a positive result, Block 535 returns the rule object which has been created to the invoking logic. Otherwise, Block 540 invokes the ParseConcl function depicted in FIG. 7. Block 545 then adds this conclusion to the conclusion list for this rule, and returns control to Block 525 to begin processing the next (if any) conclusion.

Figure 6:
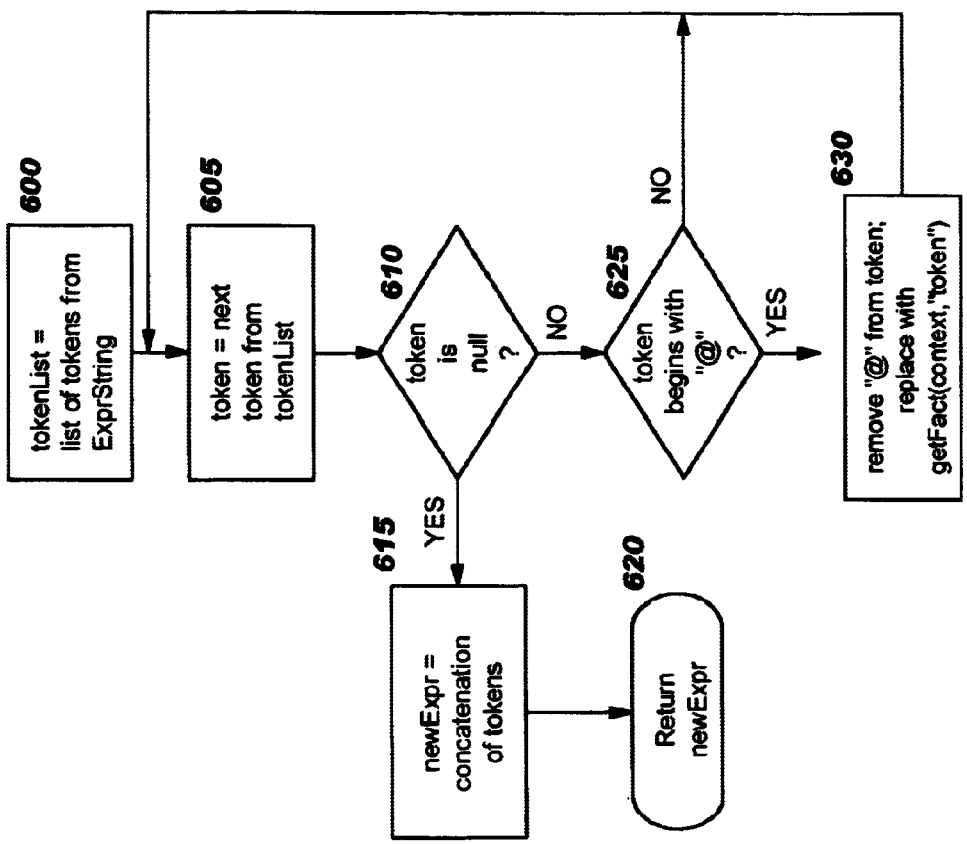

FIG. 6 illustrates a preferred embodiment of the logic which may be used to implement the ParsePremise function which is invoked from Block 515 of FIG. 5. At Block 600, the string (i.e. the input premise) passed as the input parameter is tokenized, creating a list of tokens. Block 605 locates the next token from this list. Block 610 checks to see if the token list is at the end (i.e. the token retrieved by Block 605 is null). If so, Block 615 concatenates the tokens which are in the token list into an expression, and Block 620 returns this expression to the invoking logic.

If Block 610 has a negative result, then there is another token to process in the input premise. Block 625 checks to see if this token begins with the special character "@" defined by the preferred embodiment as indicating the start of a preference or fact name. (If an alternative character or character sequence is used as an alternative, then Block 625 is modified accordingly.) If the special character is detected, Block 630 modifies the token by removing this character and replacing it with the invocation syntax of the function or method which will retrieve a fact from the fact database at execution time. In the preferred embodiment, this syntax is "getFact (context, "token")" where "context" is the name of a context object containing the fact database to be searched, and where "token" is the name of the fact (expressed in quotations within the getFact invocation syntax, to prevent its being interpreted as a variable name) to be used in the search. (This context object includes all the facts which the expression being evaluated needs to reference. Each expression thus has its own context object, which is built as the expression is being evaluated according to the logic described herein.) Furthermore, an implementation of the present invention may enable users to write input rules where Boolean equality is represented in expressions using the syntax TRUE or FALSE. In this case, tokens having these values will preferably be changed to 1 and 0, respectively, for later use during expression evaluation. (Alternatively, an implementation may require that the user specify the values 1 and 0 in the input rules, in which case it is not necessary to search for or change them.)

After operation of Block 630, or when Block 625 has a negative result, control returns to Block 605 to process the next token from the input premise.

Suppose the input premise passed to the ParsePremise function is:

(@networkSpeed<14400)

Block 600 creates a list of five tokens (, @networkSpeed, >–,>, 14400, ) from this premise. After operation of Block 630, this list is:

```
(
  getFact (context, "networkSpeed")
  <
  14400
)
```

Block 615 concatenates these elements into the expression "(getFact (context, "networkSpeed")<14400)" and returns this expression (Block 620) to the invoker.

Figure 7:
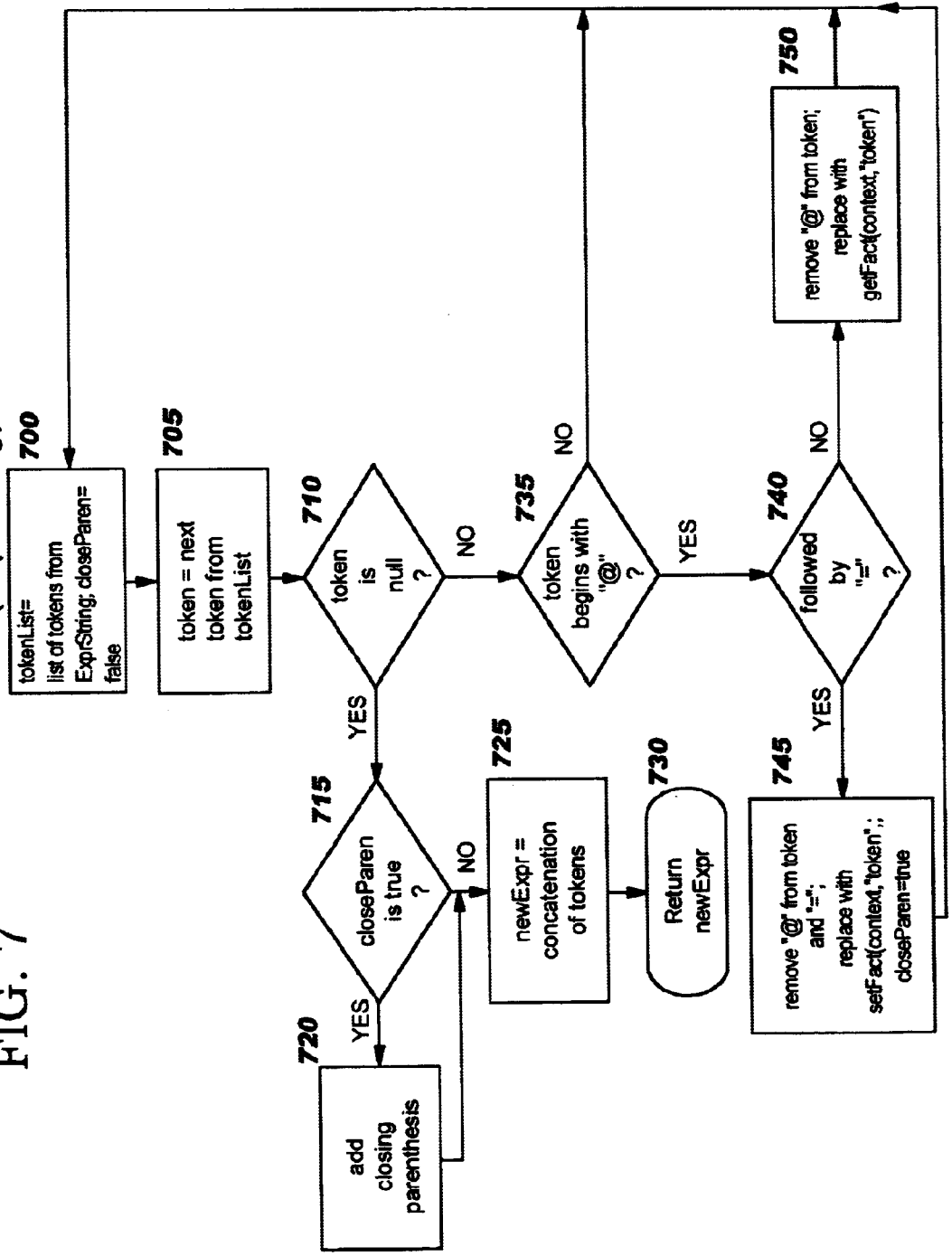

FIG. 7 illustrates a preferred embodiment of the logic which may be used to implement the ParseConcl (i.e. parse conclusion) function which is invoked from Block 540 of FIG. 5. At Block 700, the string (i.e. the input conclusion) passed as the input parameter is tokenized, creating a list of tokens. In addition, a closeParen flag is initialized to False. Block 705 locates the next token from this list. Block 710 checks to see if the token list is at the end (i.e. the token retrieved by Block 705 is null).

When Block 710 has a negative result, then there is another token to process in the input conclusion. Block 735 checks to see if this token begins with the special character "@" defined by the preferred embodiment as indicating the start of a preference or fact name. (As stated previously, if an alternative character or character sequence is used, then Block 735 is modified accordingly.) If the special character is detected, then it must be modified. Block 740 checks to see if the next subsequent token in the list is the "=" sign (or equivalent, such as ":="). If so, then Block 745 modifies the token by removing the special character from the token and deleting the subsequent "=" token from the token list, and replacing these tokens with the invocation syntax of the function or method which will enable setting a fact to a value in the fact database at execution time. In the preferred embodiment, this syntax is "setFact (context, "token"," where "context" is the name of a context object containing the fact database to be used, and where "token" is the name of the fact (in quotations, to prevent its being interpreted as a variable name) which is to be set. As described above with reference to Block 630, if TRUE or FALSE appears as a token in a rule conclusion, the values 1 and 0 are substituted, respectively. In addition, Block 745 sets the closeParen flag to True, indicating that a closing parenthesis is needed after the token specifying the value ha been processed. When there was no "=" token, indicating that the fact name was not being used in an assignment expression, then Block 740 has a negative result. In this case, Block 750 modifies the token in the same manner which has been described for Block 630 of FIG. 6. After operation of Block 745 or Block 750, control returns to Block 705 to process the next token from the input conclusion.

When Block 710 has a positive result, indicating that all the tokens in the input conclusion have been processed, Block 715 checks to see if the closeParen flag has been set to True. If so, Block 720 adds a closing parenthesis token to the token list. Following Block 720, or when Block 715 has a negative result, Block 725 concatenates the tokens which are in the token list into an expression, and Block 730 returns this expression to the invoking logic.

Suppose the input conclusion passed to the ParseConcl function is:

(@criticalInformationOnly=TRUE)

Block 700 creates a list of five tokens (, @criticalInformationOnly, =, TRUE, ) from this conclusion. After operation of Block 745, this list is then:

```
(
  setFact (context, "criticalInformationOnly",
  1
  )
```

Block 720 adds a closing parenthesis to this list, after which Block 725 concatenates these elements into the expression "(setFact (context, "criticalInformationOnly", 1))" and returns this expression (Block 730) to the invoker.

FIG. 8 illustrates the logic used by the preferred embodiment to further process the rules to be used in a backward chaining approach to inferencing. (The logic of FIGS. 11–16 then uses these processed rules, as will be described below.) The logic of this process enables quickly finding, at execution time, those rules which set a value for a particular variable (i.e. a particular fact name). As previously discussed, when attempting to resolve a conclusion of the form "IF x THEN y" (i.e. attempting to solve for y) and the value for x has not been set, a backward chaining approach searches for rules which set the value of x and attempts to fire those rules. The output of the processing of FIG. 8 is a list of the rules that set each variable. These lists can then be consulted at run-time, in effect functioning as an index into the total set of rules, to more efficiently resolve conclusions by quickly locating those rules that may lead to a particular desired result.

The processing of FIG. 8 begins at Block 800, where a list is created from the conclusions in the rule passed as the input parameter (in Block 430 of FIG. 4, according to the preferred embodiment). Block 805 retrieves the next element from this list, and Block 810 checks to see if the list has been completely processed (i.e. if the retrieved element is null). If so, control returns (Block 815) to the invoking logic; otherwise processing continues at Block 820.

Block 820 retrieves the variable name which is set by the conclusion being processed. Block 825 then searches for the list of rules pertaining to this variable name. If such a rule list is not located (i.e. a negative result at Block 830), then Block 835 creates a new rule list for the variable. Block 840 adds this rule to the rule list for the variable, after which control returns to Block 805 to begin processing the next conclusion.

In the previous example rules where variables "criticalInformationOnly" and "browserType" are set, execution of the logic of FIG. 8 creates one list which includes the rule to set "criticalInformationOnly" and another list which includes the rule to set "browserType". Obviously, an actual implementation will have many more such lists, each of which may include many more rules than one.

As previously stated, FIGS. 9 through 16 depict the logic which may be used by the inference engine 335 of FIG. 3 at run-time to aggregate values. FIGS. 9 and 10 are used in a forward chaining solution, and FIGS. 11–16 are used in a backward chaining solution. On receiving a request for processing, such as a request for downloading a document in a Web environment, the preferred embodiment preferably determines which preference sources are to be used in the aggregation decision (for example, which of profiles such as 1700, 1720, 1740, 1760 are pertinent) and then sets initial facts using that information. The UserAgent field of a HypertextTransfer Protocol (HTTP) request for a document can be consulted, for example, to determine what type of user agent or browser was used to create the request. Then, the appropriate profile can be located. The preference sources to be considered in this process are application-dependent, and may include the user's identification or name; device type; connection type; etc. Code to locate the desired information is therefore also application-dependent, and it will be obvious to one of ordinary skill in the art how to construct this logic. Preferably, the facts database is initialized to empty following each such determination of applicable sources (for example, each time a new session is begun with a particular Web document requester), such that the facts set from the source information (i.e. a fact such as "User_Agent=Mozilla" or "deviceType=WorkPad") then form the first rules in fact database 340. Facts subsequently determined from firing the rules 325 against the fact database 340, using the key/value pairs in the applicable profiles 330, 331, are then added to this fact database 340, as will now be described.

FIG. 9 illustrates a preferred embodiment of the logic which may be used to solve for a variable "v" (where the variable is passed as an input parameter) in a forward chaining inference approach when a preference value is needed (and the input parameter uses the name of the preference). Invocation of this function is preferably preceded by first checking to see whether the desired fact already exists in the database, and invoking this function when the fact is not found. At Block 900, a changes flag is initialized to false. This flag is used to control the iterations through the rules database, and provides for repeating the iteration only if new facts have been added during a prior iteration. An UnsolvedRules list is then created, initially representing the entire set of rules in the rule base. Block 905 then retrieves the next rule from the UnsolvedRules list, and Block 910 checks to see if this rule is null (indicating the end of the rules list). If so, Block 915 checks to see if this iteration set the changes flag. If so, control returns to Block 900 to retry the rules which remain using the now-extended facts database; otherwise, no further information can be gained by performing another iteration, and thus Block 930 returns the current value of variable "v" to the invoking logic.

Control reaches Block 920 when there is another unsolved rule that can be processed. The ProcessRule function depicted in FIG. 10 is invoked, passing this rule as the input parameter. FIG. 10 returns a Boolean value which is used to set the flag "factWasSet". Block 925 then checks to see if the variable "v" now has a value in the fact database. When this test has a positive result, the value is returned to the invoking logic (Block 930). (Note that the variable "v" may have had a value before invoking the ProcessRule function, and/or the ProcessRule function may have set a value for "v".) The processing of FIG. 9 for this invocation then ends.

When Block 925 has a negative result, Block 935 tests to see if the factWasSet flag is True. If so, Block 940 sets the changes flag to true and marks the current rule as having been solved. Following operation of Block 940, and when Block 935 has a negative result, control returns to Block 905 to attempt to solve the next rule from the unsolved rules list.

Processing of the logic in FIG. 9 repeats until either a result is found for the input variable, or until no more facts are set during an iteration through the rules (indicating that no result will be found).

FIG. 10 depicts a preferred embodiment of the logic which may be used to implement the ProcessRule function invoked from Block 920 of FIG. 9. (As stated with reference to FIG. 9, the logic of FIG. 10 is used in a forward chaining solution.) Block 1000 initializes a facts list "fList" to a new list, and initializes a result variable to null. Block 1005 locates all the fact names in the premise of the rule passed as input, and adds these fact names to the facts list in fList. (Note that a set is preferably used for fList, to avoid duplicate entries.) Block 1010 then locates all the fact names in the conclusion of the input rule, and adds these names to the fList as well. The detailed coding of GetPremiseNames and GetConclNames has not been shown. GetPremiseNames comprises simply a tokenizing process which then eliminates constants and special characters to yield a list of tokens which are variable names. Similarly, GetConclNames creates a list of tokens and then finds those tokens which are variable names appearing on the right-hand side of an assignment expression. (Thus, it will be obvious to one of ordinary skill in the art how this logic may be implemented.)

Block 1015 retrieves the next fact name from the list created by Blocks 1005 and 1010, and Block 1020 checks to see if this fact name is null. If so, then all the fact names for the input rule have been processed, and control transfers to Block 1025. Otherwise, Block 1050 tests to see if this fact name is present in a key/value pair in the fact database. If it is not, then it is not possible to solve this rule, and therefore the Boolean value FALSE (indicating that no new facts were set) is returned to the invoking logic by Block 1055. When the fact name is present in the fact database, then it is still possible that this rule may be solvable, so control returns to Block 1015 where the next fact name is retrieved from fList.

Control reaches Block 1025 when all the fact names in the premise and in the conclusion have been determined to be present in at least one fact in the fact database, indicating that the input rule can be evaluated. Block 1025 evaluates the premise or premises of the rule, treating multiple premises as being ANDed together as previously discussed. Block 1030 checks whether this yields the Boolean value TRUE (i.e. whether the condition part of the rule has been satisfied). If not, then the Boolean FALSE is returned to the invoking logic at Block 1035. Otherwise, Block 1040 executes the conclusion or conclusions of the input rule, which results in setting new facts. Block 1045 returns the Boolean TRUE to the invoking logic, indicating that new facts have been set.

Figure 11:
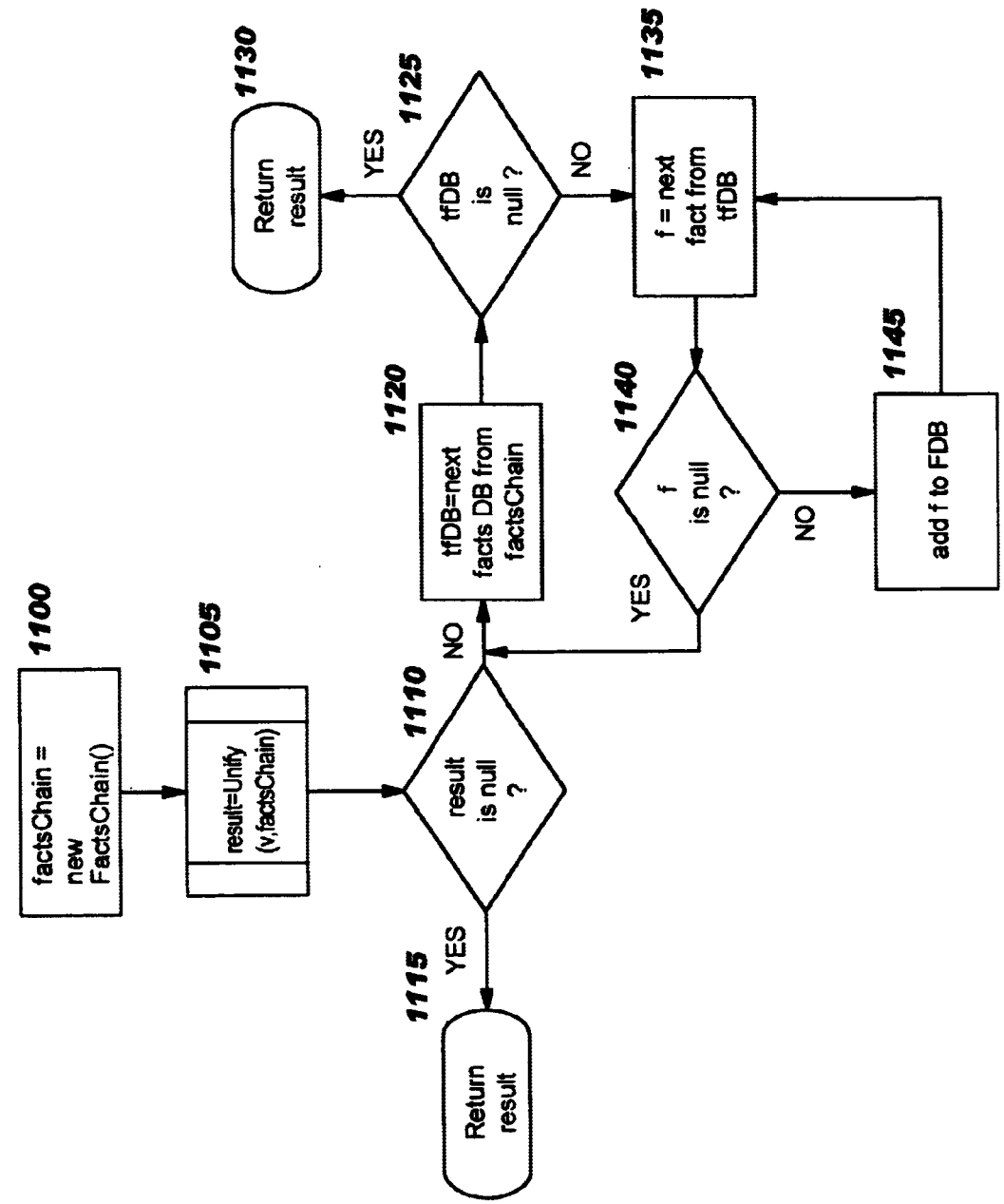

The backward chaining solution depicted in FIGS. 11–16 may be used as an alternative to the forward chaining solution just described. FIG. 11 illustrates a preferred embodiment of the top-level processing logic which may be used to resolve the value of a variable "v" (where the variable is passed as an input parameter) in this backward chaining inference approach when a preference value is needed (and the input parameter uses the name of the preference). For example, suppose the invoking code needs to know whether to suppress images in a WML document that is being processed for transmission through a network. The rules and facts used by the aggregation process of the present invention may account for many different conditions in resolving this decision, where the result may be a Boolean value. (Or, if varying degrees of image transcoding are possible, then a numeric or other value representing the appropriate transcoding may result from the aggregations process.) The application that will perform the content processing will then use the result accordingly to tailor its processing. Suppose the variable name "suppressImages" has been used in the application and in the conclusions of one or more rules which specify how to arrive at the aggregated result. In this example, the Resolve function will be invoked with the input parameter "suppressImages".

Block 1100 initializes a "factsChain" variable to an empty FactsChain. A FactsChain is preferably structured as a list of temporary fact databases, and may also include (1) one or more fact names and values and/or (2) one or more rules. Temporary fact databases are used in the backward chaining solution because a set of rules that are fired when attempting to resolve a variable may set one or more facts; however, if this set of rules eventually fails to yield the desired result, the facts which have been set must be backed out before a new set of rules for resolving the variable can be attempted.

Figure 12:
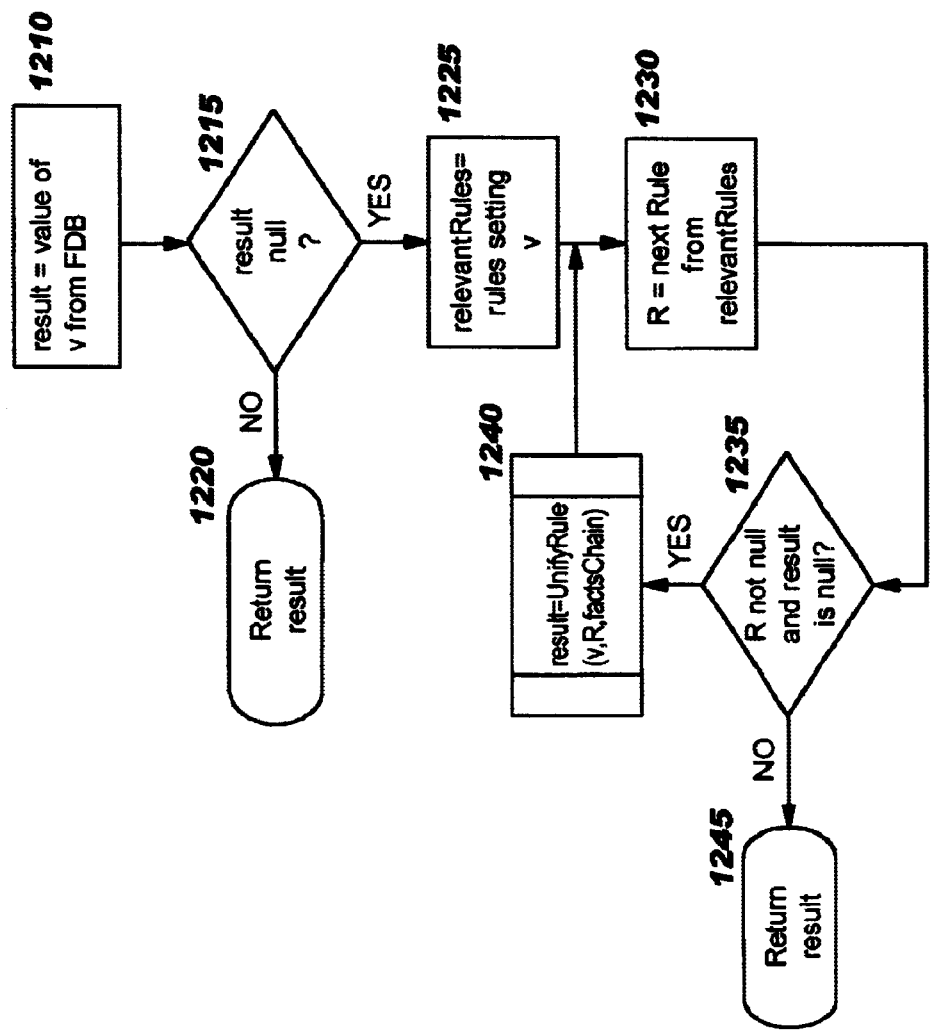

Block 1105 sets a variable "result" by invoking the Unify function depicted in FIG. 12. The parameters passed on this invocation are the variable "v", for which a solution is being attempted, and the factsChain structure. (This factsChain will be passed among the various functions as an input/output parameter to enable adding new temporary facts as rules are fired.)

Upon returning from the Unify function, Block 1110 checks to see whether the result variable has a null value. If so, then it was not possible to resolve the value of variable v, and Block 1115 therefore returns the null result to the invoking code. Otherwise, processing continues at Block 1120.

Block 1120 begins an iterative process of copying any facts which have been created in the temporary facts database(s) on the facts chain into the main facts database. (Note that this copying process is not performed when a result for variable v was not obtained: because the resolution was not successful, the facts which were set while attempting the resolution in that case are not considered valid.) The main fact, database will be referred to hereinafter as "FDB", and is preferably available to the logic of FIGS. 11–16 as a global variable. (Alternatively, the FDB may be passed as an additional input parameter to the functions of these figures.) The next temporary facts database ("tfDB") on the facts chain is located at Block 1120, and Block 1125 then checks to see if this tfDB is null. If so, then the tfDBs on the facts chain have been completely processed, and control transfers to Block 1130 where the result variable set by the Unify invocation in Block 1105 is returned to the invoking code. Otherwise, there are more tfDBs to process, and processing continues to Block 1135.

Block 1135 retrieves the next fact "f" from the current tfDB. Block 1140 checks to see if this retrieved fact is null. If so, then the current tfDB has been completely processed, and control returns to Block 1120 to get the next tfDB from the facts chain. When Block 1140 has a negative result, indicating that the retrieved fact was not null, Block 1145 concatenates (or otherwise adds) this fact to the main facts database. Control then returns to Block 1135 to retrieve the next fact. The processing of Blocks 1120, 1125, 1135, 1140, and 1145 continues until Block 1125 has a positive result, after which control returns (Block 1130) to the invoking logic.

The Unify function depicted in FIG. 12 is invoked from Block 1105 of FIG. 11, and represents the preferred embodiment of the logic which begins a unification process (i.e. attempting to bind a value to a variable by pattern matching). The Unify function takes as input parameters the variable to be resolved and a facts chain (which is used to build the temporary fact databases that are created during the current invocation of the Resolve function).

Block 1210 sets a result variable to this value of variable v, if any, in the main facts database. Block 1215 then checks to see if this yields a null result. If not, then the variable being resolved already appears in a fact within the FDB, and it is not necessary to attempt firing any rules. The value is simply returned to the invoking code at Block 1220, and the processing of FIG. 12 then ends.

Control reaches Block 1225 when the value of the variable to be resolved did not already exist in a fact. Block 1225 then sets the variable "relevantRules" to those rules which set values for v. (These are the rules which have the variable v in a conclusion, and which were preferably identified by the processing of FIG. 8.) Block 1230 reads the next rule from this list and assigns it to the variable "R". Block 1235 checks to see if (1) a rule was retrieved and (2) there is not yet a result for resolving the value of v. When both of these conditions are true, Block 1240 invokes the function UnifyRule which is depicted in detail in FIG. 13. The input parameters on the invocation are the variable v to be resolved, the current rule R, and the current factsChain. Upon returning from this invocation, control returns to Block 1230 to retrieve the next rule from the relevantRules list.

When there are no more rules that can set variable v, or when a result for the value of v has been resolved, Block 1235 has a negative result. Block 1245 then returns a null value (in the former case) or the resolved value (in the latter case) to the invoking logic.

Figure 13:
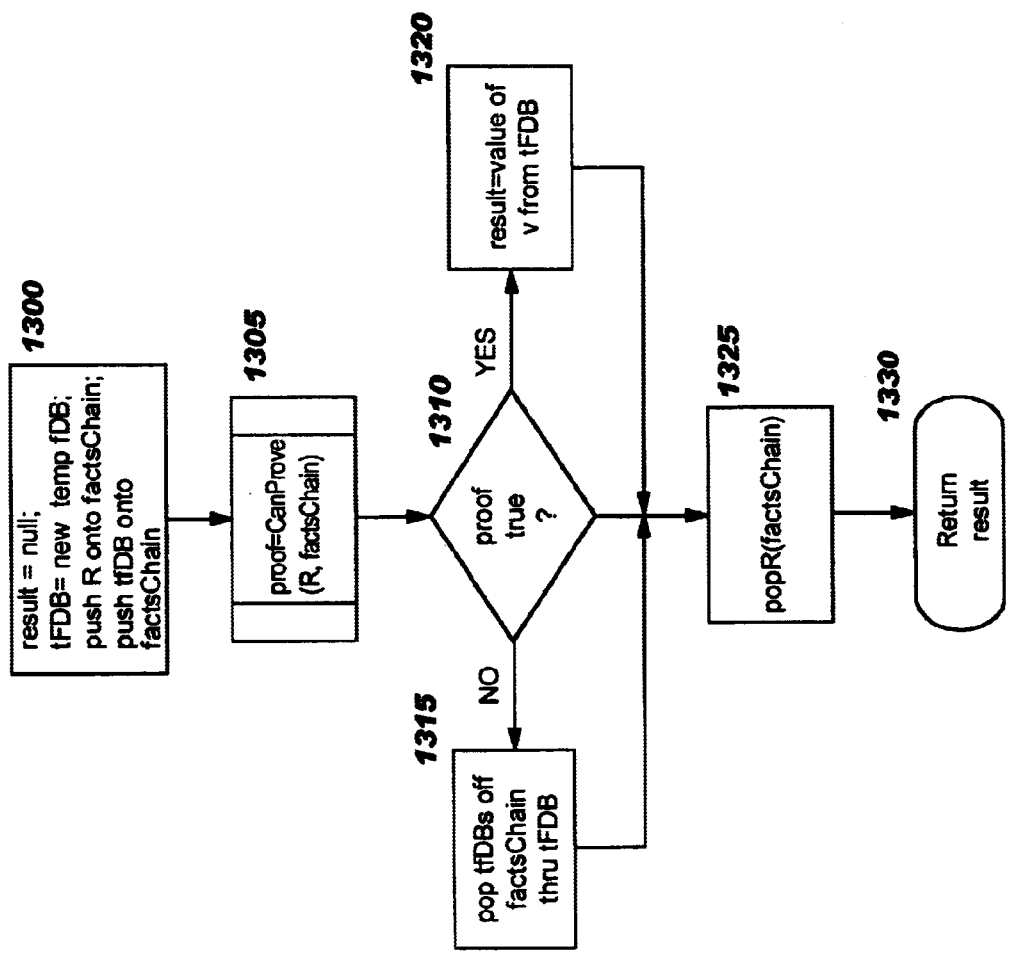
Figure 16:
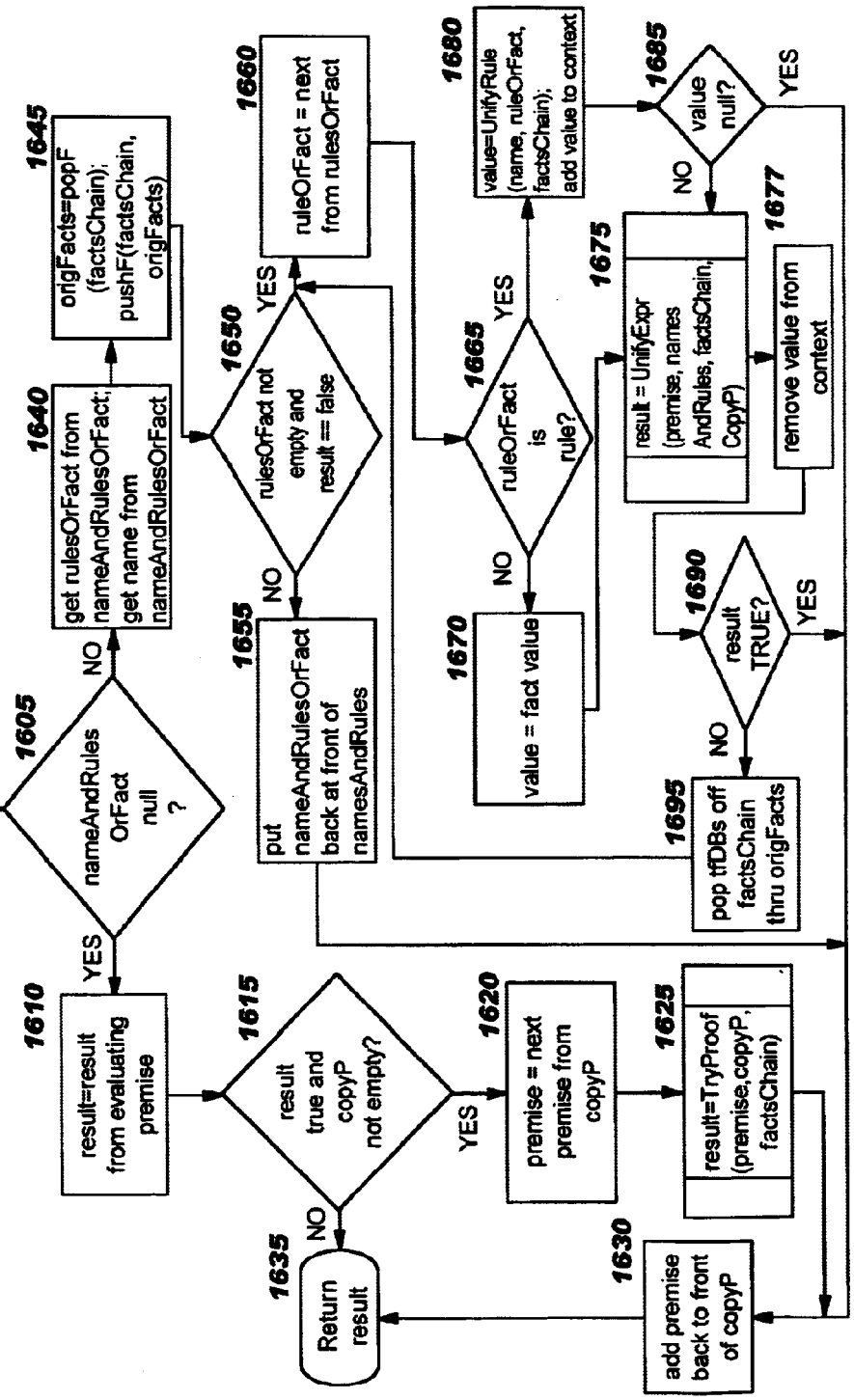

FIG. 13 illustrates a preferred embodiment of the logic used to implement the UnifyRule function which was invoked from Block 1240 of FIG. 12 (and which may also be recursively invoked from Block 1680 of FIG. 16). The input parameters, as previously stated, are a variable to be resolved, a rule to be evaluated in attempting the resolution, and the current factsChain.

Figure 14:
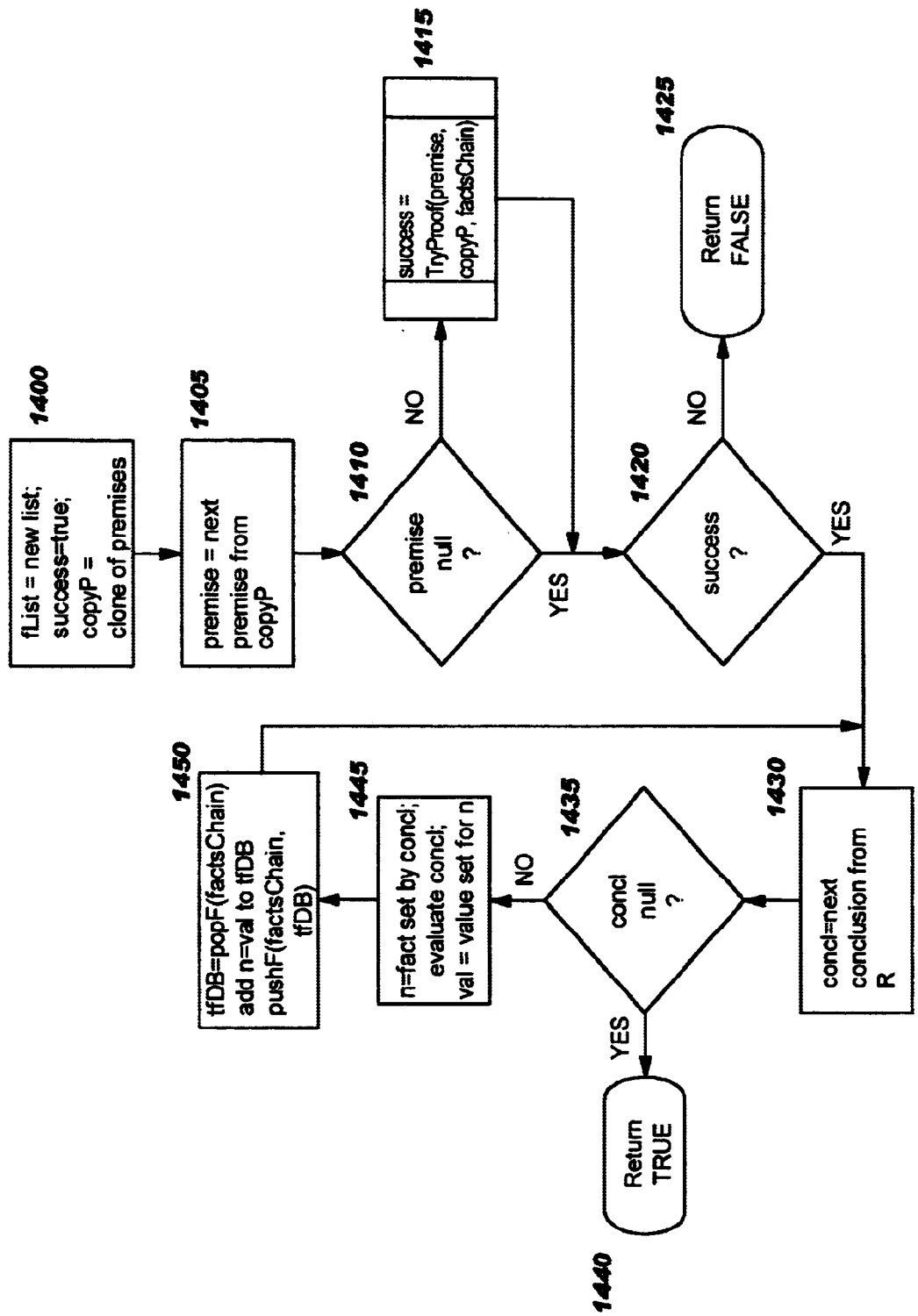

The process begins (Block 1300) by initializing a result variable to null, creating a new temporary facts database tFDB, and pushing the input rule R and this new tFDB onto the input facts chain. Block 1305 then sets a variable "proof" to the result of invoking the function CanProve, which is illustrated in FIG. 14. The parameters on this invocation are the rule R and the current factsChain, as modified by Block 1300.

Block 1310 tests the result of the CanProve invocation. If this test has a negative result, then the rule R cannot be used to resolve the variable v because the premise(s) for R cannot be satisfied. Block 1315 will then pop off any temporary facts from the facts chain that were set as rule R was being evaluated, including facts set by any rules that were fired while attempting to set the premise(s) for R (where these rules may have also caused other rules to be fired in a recursive backtracking manner, as is known in the art for backward chaining rule evaluation). Block 1325 then pops the rule R off the facts chain, restoring the facts chain to the same contents it had on entry into this function. Block 1330 returns the value of the result variable, which has a null value when Block 1315 is executed, to the invoking logic.

Block 1310 has a positive result when it is determined that the premise(s) of the current rule R can be satisfied (and thus that rule R can be used to resolve variable v). In this case, Block 1320 sets the result variable to the value of v which now exists (as a result of executing the logic of FIGS. 14–16, and thereby firing rules that set new facts) in the tFDB on the facts chain. Block 1325 then pops rule R off the facts chain, and Block 1330 returns the (non-null) value of v to the invoking code.

FIG. 14 illustrates a preferred embodiment of the logic of the CanProve function, which is invoked from Block 1305 of FIG. 13. The input parameters are a rule R to be evaluated, and a facts chain to be used in this evaluation process. Block 1400 begins by initializing a facts list "fList" to a new (empty) list, setting a success flag to true, and creating a copy of the premise(s) in the input rule as the value of variable "copyP". Block 1405 sets the value of variable "premise" to the next premise from this list in copyP. Block 1410 checks to see if the premise was null. If so, then control transfers to Block 1420; otherwise, Block 1415 invokes the TryProof function shown in FIG. 15. The parameters on this invocation are the current premise, the remaining premises (if any), and the current facts chain. The success flag is set to the result of the TryProof invocation, where this TryProof function determines whether each premise in rule R can be satisfied.

Block 1420 tests the value of the success flag. Control reaches Block 1420 when the premise from rule R was null (in which case success remains set to true from execution of Block 1400), and following evaluation of the non-null premise(s) at Block 1415. If the success flag has been set to false, then this rule R cannot be used to resolve variable v because the rule's premises cannot be met, and thus Block 1425 returns the Boolean FALSE to the invoking code. Otherwise, processing continues at Block 1430.

Upon reaching Block 1430, it is known that the fact value(s) required by the premise(s) of the current rule R can be supplied so that all the premise(s) in R can be evaluated, and therefore firing R may lead to a value for variable v. Blocks 1430 through 1450 iteratively fire (i.e. process) each conclusion in the rule. A variable "concl" is set to the next conclusion in rule R at Block 1430. Block 1435 then tests to see if this conclusion is null, indicating that all the conclusions have been processed. If so, Block 1440 returns the Boolean value TRUE. Otherwise, Block 1445 sets variable "n" to the fact set by this conclusion, evaluates the conclusion, and sets variable "val" to the value for n that is produced by the evaluation. Using an example rule which was previously discussed, the conclusion is of the form "("criticalInformationOnly"=1)", where the value 1 has replaced TRUE from the input rule. In this example, n is set to "criticalInformationOnly" and value is set to "1" during execution of Block 1445. Block 1450 then pops the tfDB off the facts chain, adds the new fact "n=val"(which is "criticalInformationOnly=1" in the example) to this tfDB, and then pushes this modified tfDB back onto the facts chain. ("popF" and "pushF" in Block 1450 indicate popping and pushing a tfDB, respectively.) Control then returns to Block 1430 to process the next (if any) conclusion in rule R.

Figure 15:
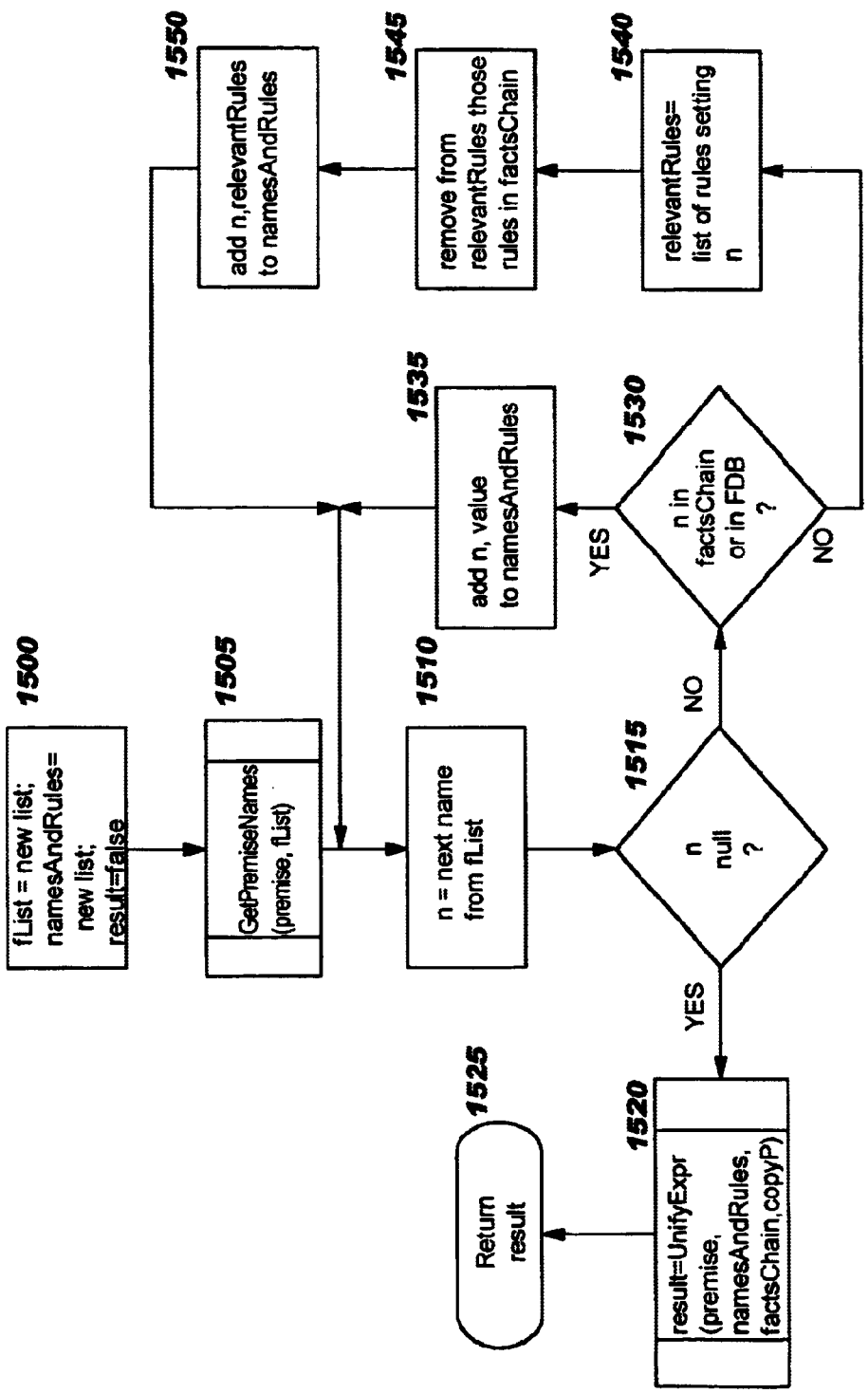

FIG. 15 illustrates a preferred embodiment of the TryProof function which was invoked from Block 1415 of FIG. 14 (and which may also be invoked from Block 1625 of FIG. 16). The input parameters to this function are a premise to be evaluated, the remaining premises (if any) from the rule currently being evaluated, and the current facts chain.

Block 1500 initializes variables "fList" and "namesAndRules" to new (empty) lists, and a result variable to false. "namesAndRules" contains fact names and either (1) a list of the rules which may set this fact, or (2) the fact in (name, value) form once it is resolved. Block 1505 extracts the fact names from the current premise and adds these fact names to fList. (As described above with reference to the processing of Block 1005, a set is preferably used for fList, to avoid duplicate entries.) Block 1510 retrieves the next name from fList, and Block 1515 then checks to see if this name is null. If so, then all the fact names from the premise have been processed, and Block 1520 invokes the UnifyExpr function illustrated in FIG. 16 to set the result variable. The parameters passed on this invocation are the input premise, the current namesAndRules list, the current facts chain, and the remaining premises of the current rule (in copyP). Upon returning from UnifyExpr, the result of the invocation is returned (Block 1525) to the code from which TryProof was invoked.

When there are still more fact names to be processed (i.e. a negative result at Block 1515), processing continues at Block 1530 where a test is made to determine whether the current fact name exists in the current facts chain or in the main FDB (as an already-resolved name, value pair). If this test has a positive result, the fact name and its value are added (Block 1535) to the namesAndRules list, after which control returns to Block 1510 to process the next fact name (if any). Otherwise, when the fact has not already been resolved, Block 1540 sets the variable "relevantRules" to the list of rules (preferably created according to the logic depicted in FIG. 8) which have conclusions that set this fact name. Block 1545 then removes from this list those rules which have already been attempted and thus are already on the fact chain (in order to avoid creating an endless loop of rule attempts). Next, Block 1550 adds the current fact name and the modified list of relevantRules to the namesAndRules list, and control returns to Block 1510 to process the next fact name from the premise. Thus, it can be seen that the namesAndRules list is created to contain the name and value for any facts which are already resolved (Block 1535), and for those facts which are not yet resolved, the fact name and the rules that will potentially lead to resolving that fact (Blocks 1540 through 1550). This namesAndRules list is passed to UnifyExpr at Block 1520, as discussed above.

A preferred embodiment of the logic used to implement the UnifyExpr function is shown in FIG. 16. This function is invoked from Block 1520 of FIG. 15, and may also be invoked recursively from Block 1675. The in put parameters to this invocation are a premise to be evaluated, a namesAndRules list, the current facts chain, and the remaining premises (if any) in the rule being evaluated. The namesAndRules list, as described above, contains an entry for each fact name in the input premise, and for each of these names further contains either a value or a list of rules that may be fired in an attempt to resolve a value for that fact name.

Block 1600 begins this process by initializing a result variable to false, and setting a variable "nameAndRulesOrFact" to the next entry from the input namesAndRules list. Block 1605 tests whether this nameAndRulesOrFact variable is null, indicating that all the entries in the list have been processed. If so, control transfers to Block 1610; otherwise, processing continues at Block 1640.

Upon reaching Block 1610, all fact names in the current (input) premise have been processed. The result variable is then set to the result of evaluating this premise using the fact values in the main FDB and the current facts chain. If this premise evaluates to TRUE and there are more premises of the rule being evaluated which need to be processed, then Block 1615 has a positive result and control transfers to Block 1620. Otherwise, when either (or both) the result of evaluating the current premise is FALSE, and there are no more premises to be evaluated, Block 1615 has a negative result and the value of result is returned to the invoking logic at Block 1635.

Block 1620 retrieves the next premise from the list passed as input. Block 1625 then sets the result variable by invoking the function TryProof (see FIG. 15), passing as input parameters this new premise, the remaining premise(s) for the current rule, and the current facts chain. Following completion of Block 1625, Block 1630 restores the premise which was just processed by Blocks 1620 and 1625 to the front of the copyP list (in case this function is invoked recursively). Block 1635 then returns the result of the TryProof invocation (from Block 1625) to the invoking code.

When control reaches Block 1640, there is an entry from the namesAndRules list to be processed (where this entry is the current value of nameAndRulesOrFact). As previously stated, each entry from namesAndRules comprises a fact name and either a list of rules that can be used to resolve that fact, or if it has already been resolved, the fact in a name, value form. Block 1640 retrieves the list of rules or the resolved fact from this entry, and stores that as the value of "rulesOrFact", and also retrieves the fact name from the entry and stores the fact name as the value of "name". Block 1645 stores a copy of the top tfDB on the facts chain as the variable "origFacts". (This variable will later be used in determining how far to pop the factsChain in Block 1695.) As indicated in Block 1645, this copy may be made by popping off the top tfDB to store as origFacts, after which the tfDB is then pushed back onto the facts chain.

Block 1650 checks to see if both of two conditions are true, where those conditions are (1) the rulesOrFact entry is not empty, and (2) the result variable is set to false. If both conditions are true, processing continues at Block 1660. When one or both of these conditions is false, then it is not productive to evaluate the information stored in rulesOrFact, so processing continues in this case at Block 1655 where the nameAndRulesOrFact information is put back at the front of the namesAndRules list (so that the entry is restored to the namesAndRules list in case this function is invoked recursively). Processing then continues at Block 1630, which puts the current premise back onto the front of the premise list in copyP, as has been described.

Control reaches Block 1660 from Block 1650 when there is something in rulesOrFact and result is still set to false. The next element of the rulesOrFact entry, where this element is either the single fact in rulesOrFact or a rule from a list of rules, is set to the variable "ruleOrFact" at Block 1660. Block 1665 then asks whether this is a rule. If it was, processing continues at Block 1680. Otherwise, when it is a fact, processing continues at Block 1670.

Block 1670 sets variable "value" to the value part of the fact. (Preferably, this value variable is part of a premise object, where this object is used when the variable "premise" is referred to herein during the discussion of the flowcharts.) Block 1675 then recursively invokes the processing of UnifyExpr, passing as input parameters the current premise, the current namesAndRules list, the current facts chain, and the remaining premises in copyP.

Upon returning from this function invocation, the value which was added to the current context object at Block 1670 or Block 1680 is removed at Block 1677. Block 1690 then tests the value that has been set as the result variable. If result is false, Block 1695 pops all the temporary facts from the facts chain through (and including) the entry origFacts (a copy of which was saved at Block 1645). Control then returns to Block 1660 to begin processing another rule. When the result tested at Block 1690 is true, processing transfers to Block 1630.

Block 1680 begins the processing of a rule from the namesAndRules list. The UnifyRule function (see FIG. 13) is invoked to attempt unification of this rule, passing as input parameters the current fact name, the rule (from ruleOrFact) to be used in evaluating this fact name, and the current facts chain. Upon returning from this invocation, the value which was returned is then added to the current context object. Block 1685 checks the value which was returned. If the value is null, then it is not possible to resolve this fact name, and control transfers to Block 1630. Otherwise, control transfers to Block 1675 which attempts unification of the expression in the premise, as has been described above.

As has been demonstrated, the present invention provides an advantageous technique for combining an enhanced scripting language and a rule-based system for creating and evaluating rules to dynamically aggregate values of one or more factors. This result is then made available to an application program, which will use it to tailor the processing of the application. This technique avoids having to change the software process itself as new values and/or new factors are deemed to be important to the aggregation result. The determination of the value is separated from the process logic which makes use of the value. Increasingly complex logic can be used to resolve the values from multiple sources, without creating complicated and hard-to-maintain statically coded logic as is required in prior art approaches. And, the logic can be easily changed by system users, administrators, or others without requiring them to understand a complicated programming language.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product for tailoring execution of a software program based on aggregated information, said computer program product embodied on a computer-readable medium and comprising:

computer-readable program code means for programmatically transforming one or more rules expressed in an enhanced scripting language into rules expressed in an existing scripting language, wherein said enhanced scripting language comprises said existing scripting language with an additional notational element added in selected rules to signify a need for said programmatic transformation prior to processing said selected rules;

computer-readable program code means for using an inferencing rule-based inference engine to process said programmatically transformed rules expressed in said existing scripting language by applying said programmatically transformed rules to a plurality of facts in a fact database to determine an aggregated result from said plurality of facts, wherein said facts specify constraints or preferences pertaining to a context of a target user;

computer-readable program code means for providing said aggregated result to said software program; and computer-readable program code means for subsequently using said provided aggregated result as an input to tailor execution of said software program based on said context of said target user.

2. The computer program product according to claim 1, wherein said computer-readable program code means for programmatically transforming further comprises:
   computer-readable program code means for programmatically locating each of said notational elements in each of said selected rules;
   computer-readable program code means for programmatically replacing said located notational elements with a value-searching syntax when said located notation element was in a premise of one of said selected rules; and
   computer-readable program code means for programmatically replacing said located notational elements with a value-setting syntax when said located notation element was in a conclusion of one of said selected rules.

3. The computer program product according to claim 2, wherein said notational element is a "@" character.

4. The computer program product according to claim 1, further comprising computer-readable program code means for compiling said transformed rules prior to operation of said computer-readable program code means for using an inferencing rule-based inference engine.

5. The computer program product according to claim 4, wherein said existing scripting language is NetRexx.

6. The computer program product according to claim 1, wherein said inference engine is a backward chaining inference engine.

7. The computer program product according to claim 1, wherein said inference engine is a forward chaining inference engine.

8. A system for tailoring execution of a software program based on aggregated information, comprising:
   means for programmatically transforming one or more rules expressed in an enhanced scripting language into rules expressed in an existing scripting language, wherein said enhanced scripting language comprises said existing scripting language with an additional notational element added in selected rules to signify a need for said programmatic transformation prior to processing said selected rules;
   means for using an inferencing rule-based inference engine to process said programmatically transformed rules expressed in said existing scripting language by applying said programmatically transformed rules to a plurality of facts in a fact database to determine an aggregated result from said plurality of facts, wherein said facts specify constraints or preferences pertaining to a context of a target user;
   means for providing said aggregated result to said software program; and
   means for subsequently using said provided aggregated result as an input to tailor execution of said software program based on said context of said target user.

9. The system according to claim 8, wherein said means for programmatically transforming further comprises:
   means for programmatically locating each of said notational elements in each of said selected rules;
   means for programmatically replacing said located notational elements with a value-searching syntax when said located notation element was in a premise of one of said selected rules; and
   means for programmatically replacing said located notational elements with a value-setting syntax when said located notation element was in a conclusion of one of said selected rules.

10. The system according to claim 9, wherein said notational element is a "@" character.

11. The system according to claim 8, further comprising means for compiling said transformed rules prior to operation of said means for using an inferencing rule-based inferencing engine.

12. The system according to claim 11, wherein said existing scripting language is NetRexx.

13. The system according to claim 8, wherein said inference engine is a backward chaining inference engine.

14. The system according to claim 8, wherein said inference engine is a forward chaining inference engine.

15. A method for tailoring execution of a software program based on aggregated information, comprising the steps of:
   programmatically transforming one or more rules expressed in an enhanced scripting language into rules expressed in an existing scripting language, wherein said enhanced scripting language comprises said existing scripting language with an additional notational element added in selected rules to signify a need for said programmatic transformation prior to processing said selected rules;
   using an inferencing rule-based inference engine to process said programmatically transformed rules expressed in said existing scripting language by applying said programmatically transformed rules to a plurality of facts in a fact database to determine an aggregated result from said plurality of facts, wherein said facts specify constraints or preferences pertaining to a context of a target user;
   providing said aggregated result to said software program; and
   subsequently using said provided aggregated result as an input to tailor execution of said software program based on said context of said target user.

16. The method according to claim 15, wherein said transforming step further comprises the steps of:
   programmatically locating each of said notational elements in each of said selected rules;
   programmatically replacing said located notational elements with a value-searching syntax when said located notation element was in a premise of one of said selected rules; and
   programmatically replacing said located notational elements with a value-setting syntax when said located notation element was in a conclusion of one of said selected rules.

17. The method according to claim 16, wherein said notational element is a "@" character.

18. The method according to claim 15, further comprising the step of compiling said transformed rules prior to operation of said step of using an inferencing rule-based inferencing engine.

19. The method according to claim 18, wherein said existing scripting language is NetRexx.

20. The method according to claim 15, wherein said inference engine is a backward chaining inference engine.

21. The method according to claim 15, wherein said inference engine is a forward chaining inference engine.

22. The computer program product according to claim 1, wherein said computer-readable program code means for using an inferencing rule-based inferencing engine further comprises:
   computer-readable program code means for attempting to resolve any value-searching syntax contained in a particular rule being applied, further comprising:

computer-readable program code means for retrieving a value from said fact database, if the value appears in said fact database in association with a fact name specified in said value-searching syntax; and computer-readable program code means for substituting said retrieved value into said particular rule in place of said value-searching syntax if said value appeared in said fact database in association with said specified fact name, and leaving said value-searching syntax in place in said particular rule otherwise; and computer-readable program code means for attempting to resolve any value-setting syntax contained in said particular rule being applied, further comprising:

computer-readable program code means for creating a new fact in said fact database, if all conditions in a premise of said particular rule being applied are true, wherein said created new fact specifies a fact name taken from said value-setting syntax in association with a fact value taken from said value-setting syntax.

23. The system according to claim 8, wherein said means for using an inferencing rule-based inferencing engine further comprises:

means for attempting to resolve any value-searching syntax contained in a particular rule being applied, further comprising:

means for retrieving a value from said fact database, if the value appears in said fact database in association with a fact name specified in said value-searching syntax; and means for substituting said retrieved value into said particular rule in place of said value-searching syntax if said value appeared in said fact database in association with said specified fact name, and leaving said value-searching syntax in place in said particular rule otherwise; and means for attempting to resolve any value-setting syntax contained in said particular rule being applied, further comprising:

means for creating a new fact in said fact database, if all conditions in a premise of said particular rule being applied are true, wherein said created new fact specifies a fact name taken from said value-setting syntax in association with a fact value taken from said value-setting syntax.

24. The method according to claim 15, wherein said step of using an inferencing rule-based inferencing engine further comprises the steps of:

attempting to resolve any value-searching syntax contained in a particular rule being applied, further comprising the steps of:

retrieving a value from said fact database, if the value appears in said fact database in association with a fact name specified in said value-searching syntax; and substituting said retrieved value into said particular rule in place of said value-searching syntax if said value appeared in said fact database in association with said specified fact name, and leaving said value-searching syntax in place in said particular rule otherwise; and attempting to resolve any value-setting syntax contained in said particular rule being applied, further comprising the step of:

creating a new fact in said fact database, if all conditions in a premise of said particular rule being applied are true, wherein said created new fact specifies a fact name taken from said value-setting syntax in association with a fact value taken from said value-setting syntax.

* * * * *